United States Patent
Berg et al.

(10) Patent No.: US 8,557,123 B2
(45) Date of Patent: *Oct. 15, 2013

(54) METHODS FOR REMOVING FINELY DISPERSED PARTICULATE MATTER FROM A FLUID STREAM

(75) Inventors: Michael C. Berg, Somerville, MA (US); John H. Dise, Kirkland, WA (US); Robert P. Mahoney, Newbury, MA (US); Kevin T. Petersen, Cheshire, CT (US); David S. Soane, Chestnut Hill, MA (US); Kristoffer K. Stokes, Jamaica Plain, MA (US); William Ware, Jr., Hanover, NH (US); Atul C. Thakrar, Minneapolis, MN (US)

(73) Assignee: Soane Energy, LLC, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,164

(22) Filed: Aug. 9, 2011

(65) Prior Publication Data
US 2012/0067824 A1  Mar. 22, 2012

Related U.S. Application Data

(63) Continuation of application No. PCT/US2009/054278, filed on Aug. 19, 2009.

(60) Provisional application No. 61/156,321, filed on Feb. 27, 2009.

(51) Int. Cl.
  *B01D 21/00* (2006.01)
(52) U.S. Cl.
  USPC ........... 210/709; 210/710; 210/712; 210/713; 210/714; 210/723; 210/732; 210/787

(58) Field of Classification Search
  USPC ........ 210/709, 710, 712, 713, 714, 723–729, 210/732, 787
  See application file for complete search history.

(56) References Cited

U.S. PATENT DOCUMENTS

| 3,352,424 A | 11/1967 | Guebert et al. |
| 3,723,310 A | 3/1973 | Lang et al. |

(Continued)

FOREIGN PATENT DOCUMENTS

| AU | 640296 | 6/1992 |
| CN | 101087733 A | 12/2007 |

(Continued)

OTHER PUBLICATIONS

Blumenschein, C. D., et al., "Sand Ballasted High Rate Clarification Process for Treatment of Process Water," available online at http://web.cecs.pdx.edu/~fishw/UO_Ballast-Actiflo.pdf. Oct. 2006.

(Continued)

*Primary Examiner* — Chester Barry
(74) *Attorney, Agent, or Firm* — Elmore Patent Law Group, P.C.; Mahreen Chaudhry Hoda, Esq.; Carolyn S. Elmore, Esq.

(57) ABSTRACT

Disclosed herein are systems for removing particulate matter from a fluid, comprising a particle functionalized by attachment of at least one activating group or amine functional group, wherein the modified particle complexes with the particulate matter within the fluid to form a removable complex therein. The particulate matter has preferably been contacted, complexed or reacted with a tethering agent. The system is particularly advantageous to removing particulate matter from a tailing solution.

11 Claims, 4 Drawing Sheets

(56) References Cited

U.S. PATENT DOCUMENTS

| | | | |
|---|---|---|---|
| 3,932,275 | A | 1/1976 | Mewes et al. |
| 3,996,696 | A | 12/1976 | Davidtz |
| 4,346,010 | A | 8/1982 | Ogino et al. |
| 4,363,749 | A | 12/1982 | Weiss et al. |
| 4,498,993 | A | 2/1985 | Raba, Jr. et al. |
| 4,569,768 | A | 2/1986 | McKinley |
| 4,882,066 | A | 11/1989 | Portier |
| 4,913,585 | A | 4/1990 | Thompson et al. |
| 5,073,272 | A | 12/1991 | O'Neill et al. |
| 5,190,660 | A | 3/1993 | Lindoy et al. |
| 5,393,435 | A | 2/1995 | Deans et al. |
| 5,433,865 | A | 7/1995 | Laurent |
| 5,449,464 | A | 9/1995 | El-Shall |
| 5,453,206 | A | 9/1995 | Browne |
| 5,543,056 | A | 8/1996 | Murcott et al. |
| 5,703,272 | A | 12/1997 | Abe et al. |
| 5,798,046 | A | 8/1998 | Greer et al. |
| 5,843,315 | A | 12/1998 | Baughn et al. |
| 6,042,732 | A | 3/2000 | Jankowski et al. |
| 6,203,711 | B1 | 3/2001 | Moffett |
| 6,214,237 | B1 | 4/2001 | Kustra et al. |
| 6,890,431 | B1 | 5/2005 | Eades et al. |
| 6,919,031 | B2 | 7/2005 | Blumenschein et al. |
| 7,001,525 | B2 | 2/2006 | Binot et al. |
| 7,153,436 | B2 * | 12/2006 | Bair et al. ............ 210/709 |
| 7,255,793 | B2 | 8/2007 | Cort |
| 7,901,583 | B2 | 3/2011 | McColl et al. |
| 8,187,470 | B2 | 5/2012 | Wang et al. |
| 8,349,188 | B2 | 1/2013 | Soane et al. |
| 8,353,641 | B2 | 1/2013 | Berg et al. |
| 2002/0139754 | A1 | 10/2002 | Miller |
| 2004/0116304 | A1 | 6/2004 | Wu et al. |
| 2006/0151360 | A1 | 7/2006 | Wright et al. |
| 2007/0085055 | A1 | 4/2007 | Sikes et al. |
| 2007/0209971 | A1 * | 9/2007 | Duyvesteyn et al. ....... 208/391 |
| 2007/0289911 | A1 * | 12/2007 | Cymerman et al. ....... 210/195.1 |
| 2009/0206040 | A1 | 8/2009 | Berg et al. |
| 2010/0098493 | A1 | 4/2010 | McColl et al. |
| 2011/0094970 | A1 | 4/2011 | Kincaid et al. |
| 2011/0131873 | A1 | 6/2011 | Soane et al. |
| 2011/0252701 | A1 | 10/2011 | Soane et al. |
| 2012/0029120 | A1 | 2/2012 | Soane et al. |
| 2012/0061321 | A1 | 3/2012 | Soane et al. |

FOREIGN PATENT DOCUMENTS

| | | |
|---|---|---|
| WO | 2004/060819 A1 | 7/2004 |
| WO | 2004060819 A1 | 7/2004 |
| WO | 2006047225 A2 | 5/2006 |
| WO | 2010098786 A1 | 7/2010 |

OTHER PUBLICATIONS

"Actiflo™ Process : Key to Efficient High-Rate Clarification," available online at http://www.veoliawaterst.com/indepth/mining_fluent/13262,actiflo_process.htm.

Zhang, et al. "Development of an Ultra-fine Coal Dewatering Technology and an Integrated Flotation-Dewatering System for Coal Preparation Plants," DOE Grant Final Report. Mar. 1, 2007.

U.S. Appl. No. 13/050,105, filed Mar. 17, 2011.

U.S. Appl. No. 13/675,661, Michael C. Berg, et al.

U.S. Appl. No. 13/788,936, David S. Soane, et al.

The Final Rejection dated May 10, 2012, U.S. Appl. No. 12/363,369.

Notice of Allowance dated Sep. 19, 2012, U.S. Appl. No. 12/363,369.

Non-Final Office Action dated Sep. 7, 2011, U.S. Appl. No. 12/363,369.

Supplemental Notice of Allowability dated Oct. 23, 2012, U.S. Appl. No. 12/792,181.

Non-Final Office Action dated Dec. 6, 2011, U.S. Appl. No. 12/792,181.

Notice of Allowance dated Sep. 17, 2012, U.S. Appl. No. 12/792,181.

Final Rejection dated Jul. 5, 2012, U.S. Appl. No. 12/792,181.

Blumenschein, C.D., et al., "Sand Ballasted High Rate Clarification Process for Treatment of Process Water," available online at http://web.cecs.pdx.edu/~fishw/UO_Ballast-Actiflo.pdf. Oct. 2006.

"Actiflo™ Process: Key to Efficient High-Rate Clarification," available online at http://www.veoliawaterst.com.indepth/mining_fluent/13262,actiflo_process.htm, obtained on Nov. 16, 2010.

Muylwyk, Q., et al., "Practical experiences in sand ballasted clarification processes," Proceedings of the Annual Conference of the Western Canada Water and Wastewater Association, Abstract (2004).

Zhang, et al. "Development of an Ultra-fine Coal Dewatering Technology and an Integrated Flotation-Dewatering System for Coal Preparation Plants". DOE Grant Final Report. Mar. 1, 2007.

* cited by examiner

US 8,557,123 B2

METHODS FOR REMOVING FINELY DISPERSED PARTICULATE MATTER FROM A FLUID STREAM

RELATED APPLICATIONS

This application is a continuation of International Application No. PCT/US2009/054278, which designated the United States and was filed on Aug. 19, 2009, published in English, which claims the benefit of U.S. Provisional Application No. 61/156,321, filed on Feb. 27, 2009. The entire teachings of the above applications are incorporated herein by reference.

PARTIES TO A JOINT RESEARCH AGREEMENT

Soane Energy, LLC and Soane Mining, LLC are parties to a "joint research agreement" as defined in 35 U.S.C. 103(c)(3).

FIELD OF THE APPLICATION

The application relates generally to systems, methods, particles and apparatus useful for removing finely dispersed particulate matter from fluid streams.

BACKGROUND

Fine materials generated from mining activities are often found well-dispersed in aqueous environments, such as wastewater. The finely dispersed materials may include such solids as various types of clay materials, recoverable materials, fine sand and silt. Separating these materials from the aqueous environment can be difficult, as they tend to retain significant amounts of water, even when separated out, unless special energy-intensive dewatering processes or long-term settling practices are employed.

An example of a high volume water consumption process is the processing of naturally occurring ores, such as coal and oil sands. Naturally occurring ores are heterogeneous mixtures of hydrophobic organic molecules or materials and solid inorganic matter. During the processing of such ores, colloidal particles, such as clay and mineral fines, are released into the aqueous phase often due to the introduction of mechanical shear. In certain embodiments, this shear is associated with the hydrocarbon-extraction process. In addition to mechanical shear, alkali water is sometimes added during extraction, creating an environment more suitable for colloidal suspensions. A common method for disposal of the resulting "tailing" solutions, which contain fine colloidal suspensions of clay and minerals, water, sodium hydroxide and small amounts of remaining hydrocarbon, is to store them in "tailings ponds". These ponds take years to settle out the contaminating fines, making the water unsuitable for recycling.

Certain industrial processes that use a large volume of water place strains on the local water supply. For example, in the oil sands extraction industry, flow rate decreases have been observed in the nearby rivers from which processing water is drawn. As a specific example, water demands are a great concern in Athabasca, an oil sand deposit located in northern Alberta Canada, near the Athabasca River. Oil sands from the Athabasca deposit are being mined and processed at a rate of roughly 1,000 kilotonnes per day. The water demand to process this amount of ore adds up to roughly 500 kdam$^3$ per year, accounting for 8% of the province's water usage. With the vast majority of the water ending up in tailings ponds, eventually the surrounding rivers will no longer be able to sustain the industry's water demand. An effective and efficient method of recycling water in this industry is essential for its long-term viability.

In addition, certain industrial processes can create waste streams of large-particle inorganic solids. Using the oil sands example, inorganic solids such as quartz remain after the extraction of hydrocarbon from the oil sands ore. Since the ore that is processed only contains about 8-12% desirable hydrocarbon, a large amount of large-particle inorganic material remains after hydrocarbon extraction. This residue is typically removed in initial separation phases of processing due to its size, insolubility and ease of sequestering. Disposal or storage of this waste material has become a problem for the oil sands industry, again due to the vast volume of many industrial processes. Attempts have been made to use this large coarse solid as a flocculant ballast for the fine colloidal suspension in the tailings ponds; however, aggregation has not been sustainably observed. It would be advantageous to modify this material so that it could be useful in-situ for wastewater treatment purposes.

A typical approach to consolidating fine materials dispersed in water involves the use of coagulants or flocculants. This technology works by linking together the dispersed particles by use of multivalent metal salts (such as calcium salts, aluminum compounds or the like) or high molecular weight polymers such as partially hydrolyzed polyacrylamides. With the use of these agents, there is an overall size increase in the suspended particle mass; moreover, their surface charges are neutralized, so that the particles are destabilized. The overall result is an accelerated sedimentation of the treated particles. Following the treatment, though, a significant amount of water remains trapped with the sedimented particles. These technologies typically do not release enough water from the sedimented material that the material becomes mechanically stable. In addition, the substances used for flocculation/coagulation may not be cost-effective, especially when large volumes of wastewater require treatment, in that they require large volumes of flocculant and/or coagulant. While ballasted flocculation systems have also been described, these systems are inefficient in sufficiently removing many types of fine particles, such as those fine particles that are produced in an oil sands mining.

Particular needs exist in the oil sands industry for removing suspended particles from fluid solutions. Tailings flowing directly from processing oil sands (termed "whole tailings") can contain fine clay particles (termed "clay fines") suspended in an alkaline water solution, along with suspended sand and other particulate matter. The whole tailings can be separated into two fluid streams by processes such as cycloning, where one fluid stream (called the underflow) contains sand, and the other fluid stream (called the overflow) contains the suspended fine clay particles. The overflow from cycloning that contains the fine clay particles is termed fine tailings. Fine tailings can be directed to large man-made tailings ponds to allow the clay particles to settle out gradually via gravity. The settling process can take many years.

As applied to the oil industry, it is desirable that the whole tailings be processed before being directed to the tailings ponds so that the water is separated from the suspended solids. If this separation is performed soon after oil sands processing, the recovered water will still be hot, so that there can be conservation of energy needed to heat the recycled water to the processing temperature. Furthermore, processing the whole tailings to recover water and solids can decrease the amount of waste materials that must be stored in facilities like tailings ponds.

An additional need in the art pertains to the management of existing tailings ponds. In their present form, they are environmental liabilities that may require extensive clean-up efforts in the future. It is desirable to prevent their expansion. It is further desirable to improve their existing state, so that their contents settle more efficiently and completely. A more thorough and rapid separation of solid material from liquid solution in the tailings pond could allow retrieval of recyclable water and compactable waste material, with an overall reduction of the footprint that they occupy.

Fine materials generated from mining activities are often found well-dispersed in aqueous environments, such as wastewater. The finely dispersed materials may include such solids as various types of clay materials, recoverable materials, fine sand and silt. Separating these materials from the aqueous environment can be difficult, as they tend to retain significant amounts of water, even when separated out, unless special energy-intensive dewatering processes or long-term settling practices are employed.

There remains an overall need in the art, therefore, for a treatment system that removes suspended particles from a fluid solution quickly, cost-effectively, and with high efficacy. It is also desirable that the treatment system yield a recovered (or recoverable) solid material that retains minimal water, so that it can be readily processed into a substance that is mechanically stable, potentially capable of bearing weight or supporting vehicular traffic, i.e., "trafficable." It is further desirable that the treatment system yields a clarified water that can be readily recycled for further industrial purposes.

An additional need in the art pertains to the management of existing tailings ponds. In their present form, they are environmental liabilities that may require extensive clean-up efforts in the future. It is desirable to prevent their expansion. It is further desirable to improve their existing state, so that their contents settle more efficiently and completely. A more thorough and rapid separation of solid material from liquid solution in the tailings pond could allow retrieval of recyclable water and compactable waste material, with an overall reduction of the footprint that they occupy.

SUMMARY

Disclosed herein are processes and apparatus for removing particulate matter from fluids. In embodiments, systems for removing particulate matter are disclosed that comprise a first fluid stream, stream containing particulate matter, an activator polymer that interacts with the particulate matter, a first introducer that inserts the activator polymer into the first fluid stream to form a first treated stream; a second fluid stream containing anchor particles; a tether polymer that coats the anchor particles and that is capable of interacting with the activator polymer; a second introducer that inserts the tether polymer into the second fluid stream to form a second treated stream; a mixing apparatus that mixes the first treated fluid stream and the second treated fluid stream so that the activator polymer binds with the tether polymer to form complexes comprising the particulate matter and the anchor particles, and a separation system that removes the complexes from the fluid. In embodiments, the anchor particle can comprise sand. In embodiments, the separation system can comprise a conveyor belt. In embodiments, the separation system can comprise a shale shaker.

Disclosed herein are processes for removing particulate matter from a fluid that comprise providing an activator polymer capable of complexing with the particulate matter; treating a first fluid stream with the activator polymer to form a first treated fluid stream comprising activator polymer complexed with the particulate matter; providing a tether polymer that is capable of interacting with the activator polymer; adding the tether polymer to a second fluid stream containing anchor particles so that the tether polymer coats the anchor particles, thereby forming a second treated fluid stream comprising coated anchor particles; and mixing the first treated fluid stream and the second treated fluid stream to form removable complexes comprising the particulate matter and the anchor particles bound together by the interaction of the activator polymer and the tether polymer. In embodiments, the process can further comprise removing the removable complexes from the fluid. In embodiments, the removable complexes can be removed by filtration. In embodiments, the removable complexes can be removed by centrifugation. In embodiments, the removable complexes can be removed by gravitational settling.

Disclosed herein are processes for removing particulate matter from a fluid stream that comprise providing an activator polymer capable of complexing with the particulate matter; treating the fluid stream with the activator polymer to form a treated fluid stream comprising activator polymer complexed with the particulate matter; providing anchor particles coated with a tether polymer that is capable of interacting with the activator polymer; adding the coated anchor particles to the treated fluid stream, thereby forming removable complexes therein comprising the particulate matter and the anchor particles bound together by the interaction of the activator polymer and the tether polymer; and removing the removable complexes from the fluid stream. In embodiments, the fluid stream can comprise mature fine tails.

The invention relates to a system for removing fine particulate matter from a fluid, comprising:
- an inflow fluid stream comprising fine particulate matter and coarse particulate matter suspended therein [300],
- an initial separator [306] for separating the inflow fluid stream into an overflow path [COF] comprising the suspended fine particulate matter and one or more underflow paths [CUF] comprising the suspended coarse particulate matter, such as a cyclone, an activator injector [310] that introduces into the overflow path an activating material [A] capable of being affixed to the fine particulate matter to form activated particles, said activated particles being suspended in a first treated fluid stream [316],
- a tether injector [326] that introduces into the underflow path a tethering material capable of being affixed to the coarse particulate matter to form anchor particles, said anchor particles being suspended in a second treated fluid stream [338],
- said activated particles and said anchor particles being capable of interaction to form removable complexes,
- a commingler [C] wherein the first treated fluid stream and the second treated fluid stream are admixed to form a conjoined treated fluid stream [320] and wherein activated particles complex with anchor particles to form removable complexes, and a settling facility [324 or 328], where the removable complexes are separated from the conjoined treated fluid stream, thereby removing fine particulate matter from the fluid.

The underflow fluid path from the separator can be split into a plurality of underflow fluid subpaths. Optionally, the first underflow subpath contains untreated cyclone underflow fluid and/or a second underflow subpath can be directed to a second separator that produces cyclone overflow and cyclone underflow. Each separator can be the same or different and are preferably hydrocyclones. Preferably, any one or each of the underflow path(s)/subpath(s) is/are treated with the tethering material. Further the cyclone overflow paths from each separator can be used independently or combined. The invention further relates to methods of removing fine particulate matter form a fluid, comprising:

separating an inflow fluid stream comprising fine particulate matter and coarse particulate matter suspended therein into an overflow path [COF] comprising the suspended fine particulate matter and an underflow path [CUF] comprising the suspended coarse particulate matter, introducing into the overflow path an activating material [A] capable of being affixed to the fine particulate matter to form activated particles, said activated particles being suspended in a first treated fluid stream [316], introducing into the underflow path a tethering material capable of being affixed to the coarse particulate matter to form anchor particles, said anchor particles being suspended in a second treated fluid stream [338], wherein said activated particles and said anchor particles are capable of interaction to form removable complexes, combining the first treated fluid stream and the second treated fluid stream to form a conjoined treated fluid stream [320] wherein activated particles complex with anchor particles to form removable complexes, and separating the removable complexes from the conjoined treated fluid stream, thereby removing fine particulate matter from the fluid.

DETAILED DESCRIPTION

A. Systems and Methods

Figure 1:
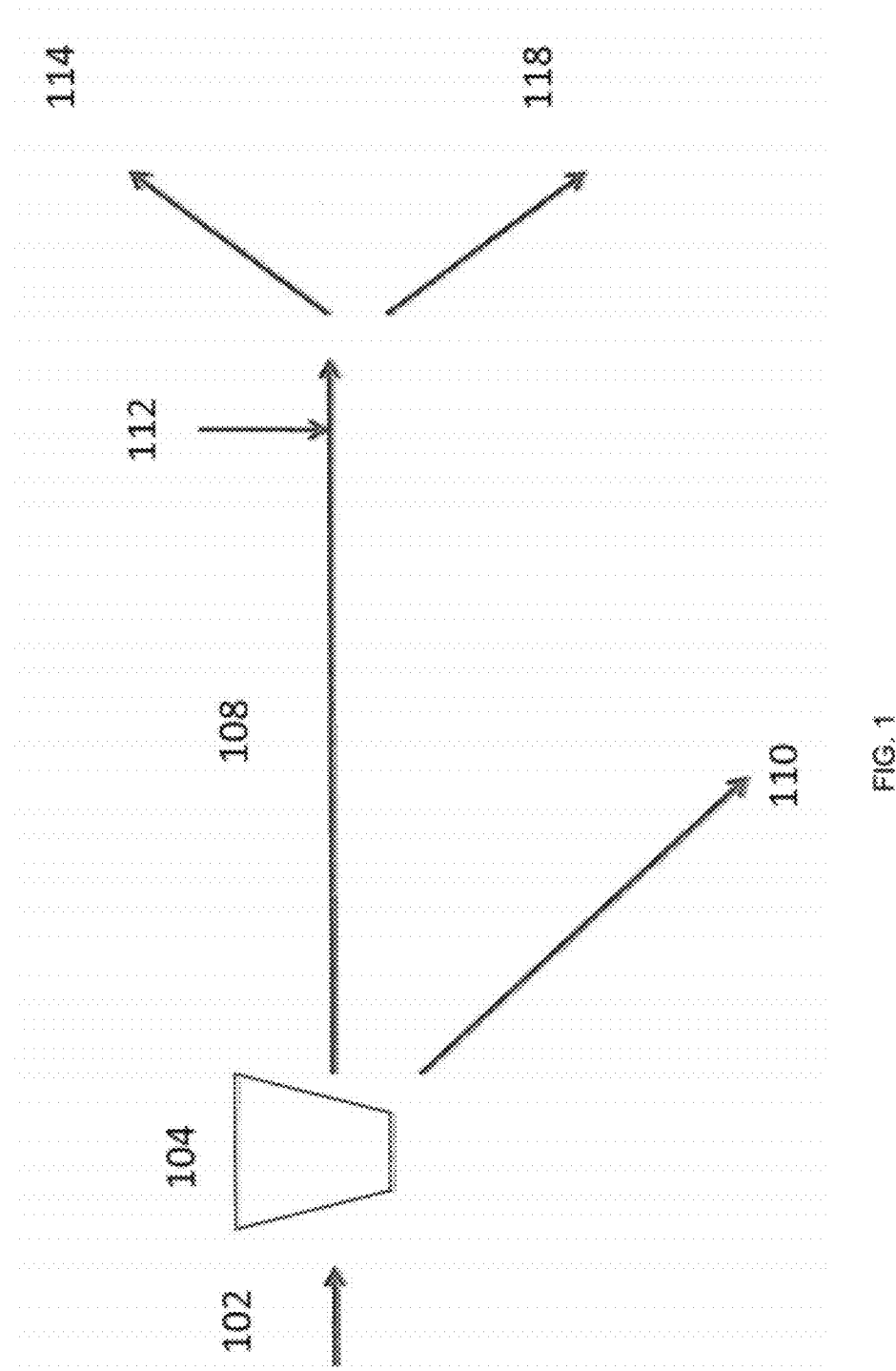
FIG. 1 shows a diagram of a fluid separation process.

Disclosed herein are systems and methods for enhancing the settlement rate of dispersed fine materials by incorporating them within a coarser particulate matrix, so that solids can be removed from aqueous suspension as a material having mechanical stability. The systems and methods disclosed herein involve three components: activating the fine particles, tethering them to anchor particles, and sedimenting the fine particle-anchor particle complex.

1. Activation

As used herein, the term "activation" refers to the interaction of an activating material, such as a polymer, with suspended particles in a liquid medium, such as an aqueous solution. An "Activator polymer" can carry out this activation. In embodiments, high molecular weight polymers can be introduced into the particulate dispersion as Activator polymers, so that these polymers interact, or complex, with fine particles. The polymer-particle complexes interact with other similar complexes, or with other particles, and form agglomerates.

This "activation" step can function as a pretreatment to prepare the surface of the fine particles for further interactions in the subsequent phases of the disclosed system and methods. For example, the activation step can prepare the surface of the fine particles to interact with other polymers that have been rationally designed to interact therewith in an optional, subsequent "tethering" step, as described below. Not to be bound by theory, it is believed that when the fine particles are coated by an activating material such as a polymer, these coated materials can adopt some of the surface properties of the polymer or other coating. This altered surface character in itself can be advantageous for sedimentation, consolidation and/or dewatering. In another embodiment, activation can be accomplished by chemical modification of the particles. For example, oxidants or bases/alkalis can increase the negative surface energy of particulates, and acids can decrease the negative surface energy or even induce a positive surface energy on suspended particulates. In another embodiment, electrochemical oxidation or reduction processes can be used to affect the surface charge on the particles. These chemical modifications can produce activated particulates that have a higher affinity for tethered anchor particles as described below.

Particles suitable for modification, or activation, can include organic or inorganic particles, or mixtures thereof. Inorganic particles can include one or more materials such as calcium carbonate, dolomite, calcium sulfate, kaolin, talc, titanium dioxide, sand, diatomaceous earth, aluminum hydroxide, silica, other metal oxides and the like. Sand or other fine fraction of the solids recovered from the mining process itself is a preferred particle source for activation. Organic particles can include one or more materials such as starch, modified starch, polymeric spheres (both solid and hollow), and the like. Particle sizes can range from a few nanometers to few hundred microns. In certain embodiments, macroscopic particles in the millimeter range may be suitable.

In embodiments, a particle, such as an amine-modified particle, may comprise materials such as lignocellulosic material, cellulosic material, minerals, vitreous material, cementitious material, carbonaceous material, plastics, elastomeric materials, and the like. In embodiments, cellulosic and lignocellulosic materials may include wood materials such as wood flakes, wood fibers, wood waste material, wood powder, lignins, or fibers from woody plants.

Examples of inorganic particles include clays such as attapulgite and bentonite. In embodiments, the inorganic compounds can be vitreous materials, such as ceramic particles, glass, fly ash and the like. The particles may be solid or may be partially or completely hollow. For example, glass or ceramic microspheres may be used as particles. Vitreous materials such as glass or ceramic may also be formed as fibers to be used as particles. Cementitious materials may include gypsum, Portland cement, blast furnace cement, alumina cement, silica cement, and the like. Carbonaceous materials may include carbon black, graphite, carbon fibers, carbon microparticles, and carbon nanoparticles, for example carbon nanotubes.

In embodiments, plastic materials may be used as particles. Both thermoset and thermoplastic resins may be used to form plastic particles. Plastic particles may be shaped as solid bodies, hollow bodies or fibers, or any other suitable shape. Plastic particles can be formed from a variety of polymers. A polymer useful as a plastic particle may be a homopolymer or a copolymer. Copolymers can include block copolymers, graft copolymers, and interpolymers. In embodiments, suitable plastics may include, for example, addition polymers (e.g., polymers of ethylenically unsaturated monomers), polyesters, polyurethanes, aramid resins, acetal resins, formaldehyde resins, and the like. Addition polymers can include, for example, polyolefins, polystyrene, and vinyl polymers. Polyolefins can include, in embodiments, polymers prepared from $C_2$-$C_{10}$ olefin monomers, e.g., ethylene, propylene, butylene, dicyclopentadiene, and the like. In embodiments, poly(vinyl chloride) polymers, acrylonitrile polymers, and the like can be used. In embodiments, useful polymers for the formation of particles may be formed by condensation reaction of a polyhydric compound (e.g., an alkylene glycol, a polyether alcohol, or the like) with one or more polycarboxylic acids. Polyethylene terephthalate is an example of a suitable polyester resin. Polyurethane resins can include, e.g., polyether polyurethanes and polyester polyurethanes. Plastics may also be obtained for these uses from waste plastic, such as post-consumer waste including plastic bags, containers, bottles made of high density polyethylene, polyethylene grocery store bags, and the like.

In embodiments, plastic particles can be formed as expandable polymeric pellets. Such pellets may have any geometry useful for the specific application, whether spherical, cylindrical, ovoid, or irregular. Expandable pellets may be pre-expanded before using them. Pre-expansion can take place by heating the pellets to a temperature above their softening point until they deform and foam to produce a loose composition having a specific density and bulk. After pre-expansion, the particles may be molded into a particular shape and size. For example, they may be heated with steam to cause them to fuse together into a lightweight cellular material with a size and shape conforming to the mold cavity. Expanded pellets may be 2-4 times larger than unexpanded pellets. As examples, expandable polymeric pellets may be formed from polystyrenes and polyolefins. Expandable pellets are available in a variety of unexpanded particle sizes. Pellet sizes, measured along the pellet's longest axis, on a weight average basis, can range from about 0.1 to 6 mm.

In embodiments, the expandable pellets may be formed by polymerizing the pellet material in an aqueous suspension in the presence of one or more expanding agents, or by adding the expanding agent to an aqueous suspension of finely subdivided particles of the material. An expanding agent, also called a "blowing agent," is a gas or liquid that does not dissolve the expandable polymer and which boils below the softening point of the polymer. Blowing agents can include lower alkanes and halogenated lower alkanes, e.g., propane, butane, pentane, cyclopentane, hexane, cyclohexane, dichlorodifluoromethane, and trifluorochloromethane, and the like. Depending on the amount of blowing agent used and the technique for expansion, a range of expansion capabilities exist for any specific unexpanded pellet system. The expansion capability relates to how much a pellet can expand when heated to its expansion temperature. In embodiments, elastomeric materials can be used as particles. Particles of natural or synthetic rubber can be used, for example.

In embodiments, the particle can be substantially larger than the fine particulates it is separating out from the process stream. For example, for the removal of particulate matter with approximate diameters less than 50 microns, particles may be selected for modification having larger dimensions. In other embodiments, the particle can be substantially smaller than the particulate matter it is separating out of the process stream, with a number of such particles interacting in order to complex with the much larger particulate matter. Particles may also be selected for modification that have shapes adapted for easier settling when compared to the target particulate matter: spherical particles, for example, may advantageously be used to remove flake-type particulate matter. In other embodiments, dense particles may be selected for modification, so that they settle rapidly when complexed with the fine particulate matter in the process stream. In yet other embodiments, extremely buoyant particles may be selected for modification, so that they rise to the fluid surface after complexing with the fine particulate matter, allowing the complexes to be removed via a skimming process rather than a settling-out process. In embodiments where the modified particles are used to form a filter, as in a filter cake, the particles selected for modification can be chosen for their low packing density or porosity. Advantageously, particles can be selected that are indigenous to a particular geographical region where the particulate removal process would take place. For example, sand can be used as the particle to be modified for removing particulate matter from the waste stream (tailings) of oil sands mining.

It is envisioned that the complexes formed from the modified particles and the particulate matter can be recovered and used for other applications. For example, when sand is used as the modified particle and it captures fine clay in tailings, the sand/clay combination can be used for road construction in the vicinity of the mining sites, due to the less compactable nature of the complexes compared to other locally available materials.

The "activation" step may be performed using flocculants or other polymeric substances. Preferably, the polymers or flocculants can be charged, including anionic or cationic polymers.

In embodiments, anionic polymers can be used, including, for example, olefinic polymers, such as polymers made from polyacrylate, polymethacrylate, partially hydrolyzed polyacrylamide, and salts, esters and copolymers thereof (such as (sodium acrylate/acrylamide) copolymers), sulfonated polymers, such as sulfonated polystyrene, and salts, esters and copolymers thereof. Suitable polycations include: polyvinylamines, polyallylamines, polydiallyldimethylammoniums (e.g., the chloride salt), branched or linear polyethyleneimine, crosslinked amines (including epichlorohydrin/dimethylamine, and epichlorohydrin/alkylenediamines), quaternary ammonium substituted polymers, such as (acrylamide/dimethylaminoethylacrylate methyl chloride quat) copolymers and trimethylammoniummethylene-substituted polystyrene, and the like. Nonionic polymers suitable for hydrogen bonding interactions can include polyethylene oxide, polypropylene oxide, polyhydroxyethylacrylate, polyhydroxyethylmethacrylate, and the like. In embodiments, an activator such as polyethylene oxide can be used as an activator with a cationic tethering material in accordance with the description of tethering materials below. In embodiments, activator polymers with hydrophobic modifications can be used. Flocculants such as those sold under the trademark MAGNAFLOC® by Ciba Specialty Chemicals can be used.

In embodiments, activators such as polymers or copolymers containing carboxylate, sulfonate, phosphonate, or hydroxamate groups can be used. These groups can be incorporated in the polymer as manufactured, alternatively they can be produced by neutralization of the corresponding acid groups, or generated by hydrolysis of a precursor such as an ester, amide, anhydride, or nitrile group. The neutralization or hydrolysis step could be done on site prior to the point of use, or it could occur in situ in the process stream.

The activated particle can also be an amine functionalized or modified particle. As used herein, the term "modified particle" can include any particle that has been modified by the attachment of one or more amine functional groups as described herein. The functional group on the surface of the particle can be from modification using a multifunctional coupling agent or a polymer. The multifunctional coupling agent can be an amino silane coupling agent as an example. These molecules can bond to a particle surface (e.g., metal oxide surface) and then present their amine group for interaction with the particulate matter. In the case of a polymer, the polymer on the surface of the particles can be covalently bound to the surface or interact with the surface of the particle and/or fiber using any number of other forces such as electrostatic, hydrophobic, or hydrogen bonding interactions. In the case that the polymer is covalently bound to the surface, a multifunctional coupling agent can be used such as a silane coupling agent. Suitable coupling agents include isocyano silanes and epoxy silanes as examples. A polyamine can then react with an isocyano silane or epoxy silane for example. Polyamines include polyallyl amine, polyvinyl amine, chitosan, and polyethylenimine.

In embodiments, polyamines (polymers containing primary, secondary, tertiary, and/or quaternary amines) can also self-assemble onto the surface of the particles or fibers to functionalize them without the need of a coupling agent. For example, polyamines can self-assemble onto the surface of the particles through electrostatic interactions. They can also be precipitated onto the surface in the case of chitosan for example. Since chitosan is soluble in acidic aqueous conditions, it can be precipitated onto the surface of particles by suspending the particles in a chitosan solution and then raising the solution pH.

In embodiments, the amines or a majority of amines are charged. Some polyamines, such as quaternary amines are fully charged regardless of the pH. Other amines can be charged or uncharged depending on the environment. The polyamines can be charged after addition onto the particles by treating them with an acid solution to protonate the amines. In embodiments, the acid solution can be non-aqueous to prevent the polyamine from going back into solution in the case where it is not covalently attached to the particle.

The polymers and particles can complex via forming one or more ionic bonds, covalent bonds, hydrogen bonding and combinations thereof, for example. Ionic complexing is preferred.

To obtain activated fine materials, the activator could be introduced into a liquid medium through several different means. For example, a large mixing tank could be used to mix an activating material with tailings from oil sands processing bearing fine particulate materials. Alternatively, the activating material can be added along a transport pipeline and mixed, for example, by the turbulence encountered in fluid transport, optionally aided by a static mixer or series of baffles. Activated particles are produced that can be treated with one or more subsequent steps of tethering and anchor-separation. Examples of processes and apparatus for introducing an activating agent into a liquid medium to contact fine particulate matter are illustrated in FIGS. 1-3B, and are described in more detail below.

The particles that can be activated are generally fine particles that are resistant to sedimentation. Examples of particles that can be filtered or otherwise removed in accordance with the invention include metals, sand, inorganic, or organic particles. The methods and products of the invention are particularly useful to isolate particles generated from mining operations, such as oil sands processing or other mineral retrieval operations or other bitumen associated solids. The particles are generally fine particles, such as particles having a mean diameter of less than 50 microns or particle fraction that remains with the filtrate following a filtration with, for example, a 325 mesh filter such as a Tyler sieve. The particles to be removed in the processes described herein are also referred to as "fines."

2. Tethering

As used herein, the term "tethering" refers to an interaction between an activated fine particle and an anchor particle (as described below). The anchor particle can be treated or coated with a tethering material. The tethering material, such as a polymer, forms a complex or coating on the surface of the anchor particles such that the tethered anchor particles have an affinity for the activated fines. In embodiments, the selection of tether and activator materials is intended to make the two solids streams complementary so that the activated fine particles become tethered, linked or otherwise attached to the anchor particle. When attached to activated fine particles via tethering, the anchor particles enhance the rate and completeness of sedimentation or removal of the fine particles.

In accordance with these systems and methods, the tethering material acts as a complexing agent to affix the activated particles to an anchor material. In embodiments, sand can be used as an anchor material, as may a number of other substances, as set forth in more detail below. In embodiments, a tethering material can be any type of material that interacts strongly with the activating material and that is connectable to an anchor particle.

As used herein, the term "anchor particle" refers to a particle which facilitates the separation of fine particles. Generally, anchor particles have a density that is greater than the liquid process stream. For example, anchor particles that have a density of greater than 1.3 g/cc can be used. Additionally or alternatively, the density of the anchor particles can be greater than the density of the fine particles or activated particles. Alternatively, the density is less than the dispersal medium, or density of the liquid or aqueous stream. Alternatively, the anchor particles are simply larger than the fine particles or the activated fine particles. A difference in density or particle size facilitates separating the solids from the medium.

For example, for the removal of particulate matter with an approximate mean diameter less than 50 microns, anchor particles may be selected having larger dimensions, e.g., a mean diameter of greater than 70 microns. An anchor particle for a given system can have a shape adapted for easier settling when compared to the target particulate matter: spherical particles, for example, may advantageously be used as anchor particles to remove particles with a flake or needle morphology. In other embodiments, increasing the density of the anchor particles may lead to more rapid settlement. Alternatively, less dense anchors may provide a means to float the fine particles, using a process to skim the surface for removal. In this embodiment, one may choose anchor particles having a density of less than about 0.9 g/cc, for example, 0.5 g/cc, to remove fine particles from an aqueous process stream.

Advantageously, anchor particles can be selected that are indigenous to a particular geographical region where the particulate removal process would take place. For example, sand can be used as the anchor particle for use in removing fine particulate matter from the waste stream (tailings) of oil sands mining.

Suitable anchor particles can be formed from organic or inorganic materials, or any mixture thereof. Particles suitable for use as anchor particles can include organic or inorganic particles, or mixtures thereof. Inorganic particles can include one or more materials such as calcium carbonate, dolomite, calcium sulfate, kaolin, talc, titanium dioxide, sand, diatomaceous earth, aluminum hydroxide, silica, other metal oxides and the like. The coarse fraction of the solids recovered from the mining process itself, is a preferred particle source for anchor particles. Organic particles can include one or more materials such as starch, modified starch, polymeric spheres (both solid and hollow), and the like. Particle sizes can range from a few nanometers to few hundred microns. In certain embodiments, macroscopic particles in the millimeter range may be suitable.

In embodiments, a particle, such as an amine-modified particle, may comprise materials such as lignocellulosic material, cellulosic material, minerals, vitreous material, cementitious material, carbonaceous material, plastics, elastomeric materials, and the like. In embodiments, cellulosic and lignocellulosic materials may include wood materials such as wood flakes, wood fibers, wood waste material, wood powder, lignins, or fibers from woody plants.

Examples of inorganic particles include clays such as attapulgite and bentonite. In embodiments, the inorganic compounds can be vitreous materials, such as ceramic particles, glass, fly ash and the like. The particles may be solid or may be partially or completely hollow. For example, glass or ceramic microspheres may be used as particles. Vitreous materials such as glass or ceramic may also be formed as fibers to be used as particles. Cementitious materials may include gypsum, Portland cement, blast furnace cement, alumina cement, silica cement, and the like. Carbonaceous materials may include carbon black, graphite, carbon fibers, carbon microparticles, and carbon nanoparticles, for example carbon nanotubes.

In embodiments, plastic materials may be used as particles. Both thermoset and thermoplastic resins may be used to form plastic particles. Plastic particles may be shaped as solid bodies, hollow bodies or fibers, or any other suitable shape. Plastic particles can be formed from a variety of polymers. A polymer useful as a plastic particle may be a homopolymer or a copolymer. Copolymers can include block copolymers, graft copolymers, and interpolymers. In embodiments, suitable plastics may include, for example, addition polymers (e.g., polymers of ethylenically unsaturated monomers), polyesters, polyurethanes, aramid resins, acetal resins, formaldehyde resins, and the like. Addition polymers can include, for example, polyolefins, polystyrene, and vinyl polymers. Polyolefins can include, in embodiments, polymers prepared from $C_2$-$C_{10}$ olefin monomers, e.g., ethylene, propylene, butylene, dicyclopentadiene, and the like. In embodiments, poly(vinyl chloride) polymers, acrylonitrile polymers, and the like can be used. In embodiments, useful polymers for the formation of particles may be formed by condensation reaction of a polyhydric compound (e.g., an alkylene glycol, a polyether alcohol, or the like) with one or more polycarboxylic acids. Polyethylene terephthalate is an example of a suitable polyester resin. Polyurethane resins can include, e.g., polyether polyurethanes and polyester polyurethanes. Plastics may also be obtained for these uses from waste plastic, such as post-consumer waste including plastic bags, containers, bottles made of high density polyethylene, polyethylene grocery store bags, and the like.

In embodiments, plastic particles can be formed as expandable polymeric pellets. Such pellets may have any geometry useful for the specific application, whether spherical, cylindrical, ovoid, or irregular. Expandable pellets may be pre-expanded before using them. Pre-expansion can take place by heating the pellets to a temperature above their softening point until they deform and foam to produce a loose composition having a specific density and bulk. After pre-expansion, the particles may be molded into a particular shape and size. For example, they may be heated with steam to cause them to fuse together into a lightweight cellular material with a size and shape conforming to the mold cavity. Expanded pellets may be 2-4 times larger than unexpanded pellets. As examples, expandable polymeric pellets may be formed from polystyrenes and polyolefins. Expandable pellets are available in a variety of unexpanded particle sizes. Pellet sizes, measured along the pellet's longest axis, on a weight average basis, can range from about 0.1 to 6 mm.

In embodiments, the expandable pellets may be formed by polymerizing the pellet material in an aqueous suspension in the presence of one or more expanding agents, or by adding the expanding agent to an aqueous suspension of finely subdivided particles of the material. An expanding agent, also called a "blowing agent," is a gas or liquid that does not dissolve the expandable polymer and which boils below the softening point of the polymer. Blowing agents can include lower alkanes and halogenated lower alkanes, e.g., propane, butane, pentane, cyclopentane, hexane, cyclohexane, dichlorodifluoromethane, and trifluorochloromethane, and the like. Depending on the amount of blowing agent used and the technique for expansion, a range of expansion capabilities exist for any specific unexpanded pellet system. The expansion capability relates to how much a pellet can expand when heated to its expansion temperature. In embodiments, elastomeric materials can be used as particles. Particles of natural or synthetic rubber can be used, for example.

In embodiments, the particle can be substantially larger than the fine particulates it is separating out from the process stream. For example, for the removal of particulate matter with approximate diameters less than 50 microns, particles may be selected for modification having larger dimensions. In other embodiments, the particle can be substantially smaller than the particulate matter it is separating out of the process stream, with a number of such particles interacting in order to complex with the much larger particulate matter. Particles may also be selected for modification that have shapes adapted for easier settling when compared to the target particulate matter: spherical particles, for example, may advantageously be used to remove flake-type particulate matter. In other embodiments, dense particles may be selected for modification, so that they settle rapidly when complexed with the fine particulate matter in the process stream. In yet other embodiments, extremely buoyant particles may be selected for modification, so that they rise to the fluid surface after complexing with the fine particulate matter, allowing the complexes to be removed via a skimming process rather than a settling-out process. In embodiments where the modified particles are used to form a filter, as in a filter cake, the particles selected for modification can be chosen for their low packing density or porosity. Advantageously, particles can be selected that are indigenous to a particular geographical region where the particulate removal process would take place. For example, sand can be used as the particle to be modified for removing particulate matter from the waste stream (tailings) of oil sands mining.

It is envisioned that the complexes formed from the modified particles and the particulate matter can be recovered and used for other applications. For example, when sand is used as the modified particle and it captures fine clay in tailings, the sand/clay combination can be used for road construction in the vicinity of the mining sites, due to the less compactable nature of the complexes compared to other locally available materials.

Anchor particle sizes (as measured as a mean diameter) can have a size up to few hundred microns, preferably greater than about 70 microns. In certain embodiments, macroscopic anchor particles up to and greater than about 1 mm may be suitable. Recycled materials or waste, particularly recycled materials and waste having a mechanical strength and durability suitable to produce a product useful in building roads and the like are particularly advantageous.

As an example of a tethering material used with an anchor particle in accordance with these systems and methods, chitosan can be precipitated onto sand particles, for example, via pH-switching behavior. The chitosan can have affinity for anionic systems that have been used to activate fine particles. In one example, partially hydrolyzed polyacrylamide polymers can be used to activate particles, resulting in a particle with anionic charge properties. The cationic charge of the chitosan will attract the anionic charge of the activated particles, to attach the sand particles to the activated fine particles.

In embodiments, various interactions such as electrostatic, hydrogen bonding or hydrophobic behavior can be used to affix an activated particle or particle complex to a tethering material complexed with an anchor particle. In the foregoing example, electrostatic interactions can govern the assembly of the activated fine particle complexes bearing the anionic partially-hydrolyzed polyacrylamide polymer and the cationic sand particles complexed with the chitosan tethering material.

In embodiments, polymers such as linear or branched polyethyleneimine can be used as tethering materials. It would be understood that other anionic or cationic polymers could be used as tethering agents, for example polydiallyldimethylammonium chloride poly(DADMAC).

In other embodiments, cationic tethering agents such as epichlorohydrin dimethylamine (epi/DMA), styrene maleic anhydride imide (SMAI), polyethylene imide (PEI), polyvinylamine, polyallylamine, amine-aldehyde condensates, poly(dimethylaminoethyl acrylate methyl chloride quaternary) polymers and the like can be used. Advantageously, cationic polymers useful as tethering agents can include quaternary ammonium or phosphonium groups. Advantageously, polymers with quaternary ammonium groups such as poly (DADMAC) or epi/DMA can be used as tethering agents. In other embodiments, polyvalent metal salts (e.g., calcium, magnesium, aluminum, iron salts, and the like) can be used as tethering agents. In other embodiments cationic surfactants such as dimethyldialkyl(C8-C22)ammonium halides, alkyl (C8-C22)trimethylammonium halides, alkyl(C8-C22)dimethylbenzylammonium halides, cetyl pyridinium chloride, fatty amines, protonated or quaternized fatty amines, fatty amides and alkyl phosphonium compounds can be used as tethering agents. In embodiments, polymers having hydrophobic modifications can be used as tethering agents.

The efficacy of a tethering material, however, can depend on the activating material. A high affinity between the tethering material and the activating material can lead to a strong and/or rapid interaction there between. A suitable choice for tether material is one that can remain bound to the anchor surface, but can impart surface properties that are beneficial to a strong complex formation with the activator polymer. For example, a polyanionic activator can be matched with a polycationic tether material or a polycationic activator can be matched with a polyanionic tether material. In one embodiment, a poly(sodium acrylate-co-acrylamide) activator is matched with a chitosan tether material.

In hydrogen bonding terms, a hydrogen bond donor should be used in conjunction with a hydrogen bond acceptor. In embodiments, the tether material can be complementary to the chosen activator, and both materials can possess a strong affinity to their respective deposition surfaces while retaining this surface property.

In other embodiments, cationic-anionic interactions can be arranged between activated fine particles and tether-bearing anchor particles. The activator may be a cationic or an anionic material, as long as it has an affinity for the fine particles to which it attaches. The complementary tethering material can be selected to have affinity for the specific anchor particles being used in the system. In other embodiments, hydrophobic interactions can be employed in the activation-tethering system.

The anchor particle material is preferably added in an amount which permits a flowable slurry. For example, the particle material can be added in an amount greater than 1 gram/liter but less than the amount which results in a non-flowable sludge or slurry, amounts between about 1 to about 1000 grams/liter, preferably 5 to 100 g/l are often suitable. In some embodiments, it may be desirable to maintain the concentration of the anchor particles to 20 g/l or higher. The anchor particles may be fresh (unused) material, recycled, cleaned ballast, or recycled, uncleaned ballast.

In embodiments, for example when sand is chosen as an anchor particle, higher amounts of the particle material may be added. For example, sand can be added in a range between 1-300 gm/l, preferably between 50-300 gm/l, for example at a dosage level of 240 gm/l.

In certain embodiments, a fines stream may itself provide anchor particles, as is depicted illustratively in FIG. 3. For example, a fluid stream containing fines (e.g., a mature fine tailings stream or a cyclone overflow stream) can be split into two flow paths, with an activator being added to one stream and a tethering material being added to the other. When these two streams are recombined, the activator-tether-anchor complexation occurs, allowing the fines to be separated out of the fluid.

3. Settling

It is envisioned that the complexes formed from the anchor particles and the activated particulate matter can be recovered and used for other applications. For example, when sand is used as the modified particle and it captures fine clay in tailings, the sand/clay combination can be used for road construction in the vicinity of the mining sites, due to the less compactable nature of the complexes compared to other locally available materials.

In embodiments, the interactions between the activated fine particles and the tether-bearing anchor particles can enhance the mechanical properties of the complex that they form. For example, an activated fine particle or collection thereof can be durably bound to one or more tether-bearing anchor particles, so that they do not segregate or move from the position that they take on the particles. This property of the complex can make it mechanically more stable.

Increased compatibility of the activated fine materials with a denser (anchor) matrix modified with the appropriate tether polymer can lead to further mechanical stability of the resulting composite material. This becomes quite important when dealing with tailings resulting from mining. This composite material can then be further utilized within the project for road building, dyke construction, or even land reclamation, rather than simply left in a pond to settle at a much slower rate.

A variety of techniques are available for removing the activated-tethered-anchored (ATA) complexes from the fluid stream. For example, the tether-bearing anchor particles can be mixed into a stream carrying activated fine particles, and the complexes can then separated via a settling process such as gravity or centrifugation. In another method, the process stream carrying the activated fine particles could flow through a bed or filter cake of the tether-bearing anchor particles. In any of these methods, the modified particles interact with the fine particulates and pull them out of suspension so that later separation removes both modified particles and fine particulates.

As would be appreciated by artisans of ordinary skill, a variety of separation processes could be used to remove the complexes of modified particles and fine particulates. For example, if the anchor particles had magnetic properties, the complexes formed by the interaction of tether-bearing anchor particles and activated fine particulates could be separated using a magnetic field. As another example, if the tether-bearing anchor particles were prepared so that they were electrically conductive, the complexes formed by the interaction of tether-bearing anchor particles and activated fine particulates could be separated using an electric field.

As would be further appreciated by those of ordinary skill, tether-bearing anchor particles could be designed to complex with a specific type of activated particulate matter. The systems and methods disclosed herein could be used for complexing with organic waste particles, for example. Other activation-tethering-anchoring systems may be envisioned for removal of suspended particulate matter in fluid streams, including gaseous streams.

4. Applications a. In-line Tailings Processing

Extraction of bitumen from oil sands can involve the use of hot water with a caustic agent applied to the mined oil sands ore. During this process, clay particulate matter bound up in the oil sands ore can be exfoliated, producing fine, positively charged clay particles ("fines") that remain suspended in the effluent fluid stream. The effluent fluid stream can be directed to a mechanical separator such as a cyclone that can separate the fluid stream into two components, an overflow fluid comprising fine tails that contains the fine (<approximately 50 micron) clay particles, and an underflow fluid stream that contains coarse tails, mainly sand, with a small amount of fine clay particles.

In embodiments, the systems and methods disclosed herein can treat each fluid stream (including, but not limited to, effluent fluid streams from bitumen extraction methods), an overflow fluid and/or an underflow fluid. An activating agent, such as a polyanion as described above, can preferably be introduced into the overflow fluid stream, resulting in a flocculation of the fine particles therein, often forming a soft, spongy mass. The underflow fluid can be used for the preparation of tether-bearing anchor particles. However, it will be clear that other sources for anchor particles (e.g., sand) can also be used.

The sand within the underflow fluid can act as an "anchor particle," as described above. A cationic tethering agent, as described above, can be introduced into the underflow fluid so that it self-assembles onto the surface of the anchor particles, creating a plurality of tether-bearing anchor particles.

Following this treatment to each fluid stream, the two fluid streams can be re-mixed in a batch, semi-batch or continuous fashion. The tether-bearing anchor particles can interact, preferably electrostatically, with the activated, preferably flocculating, fine clay particles, forming large agglomerations of solid material that can be readily removed from or settled in the resulting fluid mixture.

In embodiments, the aforesaid systems and methods are amenable to incorporation within existing tailings separation systems. For example, a treatment process can be added in-line to each of the separate flows from the overflow and underflow fluids; treated fluids then re-converge to form a single fluid path from which the resulting agglomerations can be removed. Removal of the agglomerations can take place, for example, by filtration, centrifugation, or other type of mechanical separation.

In one embodiment, the fluid path containing the agglomerated solids can be subsequently treated by a conveyor belt system, analogous to those systems used in the papermaking industry. In an exemplary conveyor belt system, the mixture of fluids and agglomerated solids resulting from the electrostatic interactions described above can enter the system via a headbox. A moving belt containing a mechanical separator can move through the headbox, or the contents of the headbox are dispensed onto the moving belt, so that the wet agglomerates are dispersed along the moving belt. One type of mechanical separator can be a filter with a pore size smaller than the average size of the agglomerated particles. The size of the agglomerated particles can vary, depending upon the size of the constituent anchor particles (i.e., sand). For example, for systems where the sand component has a size between 50/70 mesh, an 80 mesh filter can be used. Other adaptations can be envisioned by artisans having ordinary skill in the art. Agglomerated particles can be transported on the moving belt and further dewatered. Optionally, mechanical pressure can be used to cause further dewatering of the agglomerated slurry, for example in a belt press. Water removed from the agglomerated particles and residual water from the headbox from which agglomerates have been removed can be collected in whole or in part within the system and optionally recycled for use in subsequent oil sands processing.

In embodiments, the filtration mechanism can be an integral part of the moving belt. In such embodiments, the captured agglomerates can be physically removed from the moving belt so that the filter can be cleaned and regenerated for further activity. In other embodiments, the filtration mechanism can be removable from the moving belt. In such embodiments, the spent filter can be removed from the belt and a new filter can be applied. In such embodiments, the spent filter can optionally serve as a container for the agglomerated particles that have been removed.

Advantageously, as the agglomerated particles are arrayed along the moving belt, they can be dewatered and/or dried. These processes can be performed, for example, using heat, air currents, or vacuums. Agglomerates that have been dewatered and dried can be formed as solid masses, suitable for landfill, construction purposes, or the like.

Desirably, the in-line tailings processing described above is optimized to capitalize upon the robustness and efficiency of the electrostatic interaction between the activated tailings and the tether-bearing anchor particles. Advantageously, the water is quickly removed from the fresh tailings during the in-line tailings processing, to minimize heat losses. Recycling this hot water saves energy: water that is already hot does not require as much heating to get it to an operational processing temperature, while recycling cold water, such as would be found in tailings ponds, requires a substantial amount of heating and resultant energy use.

Figure 2:
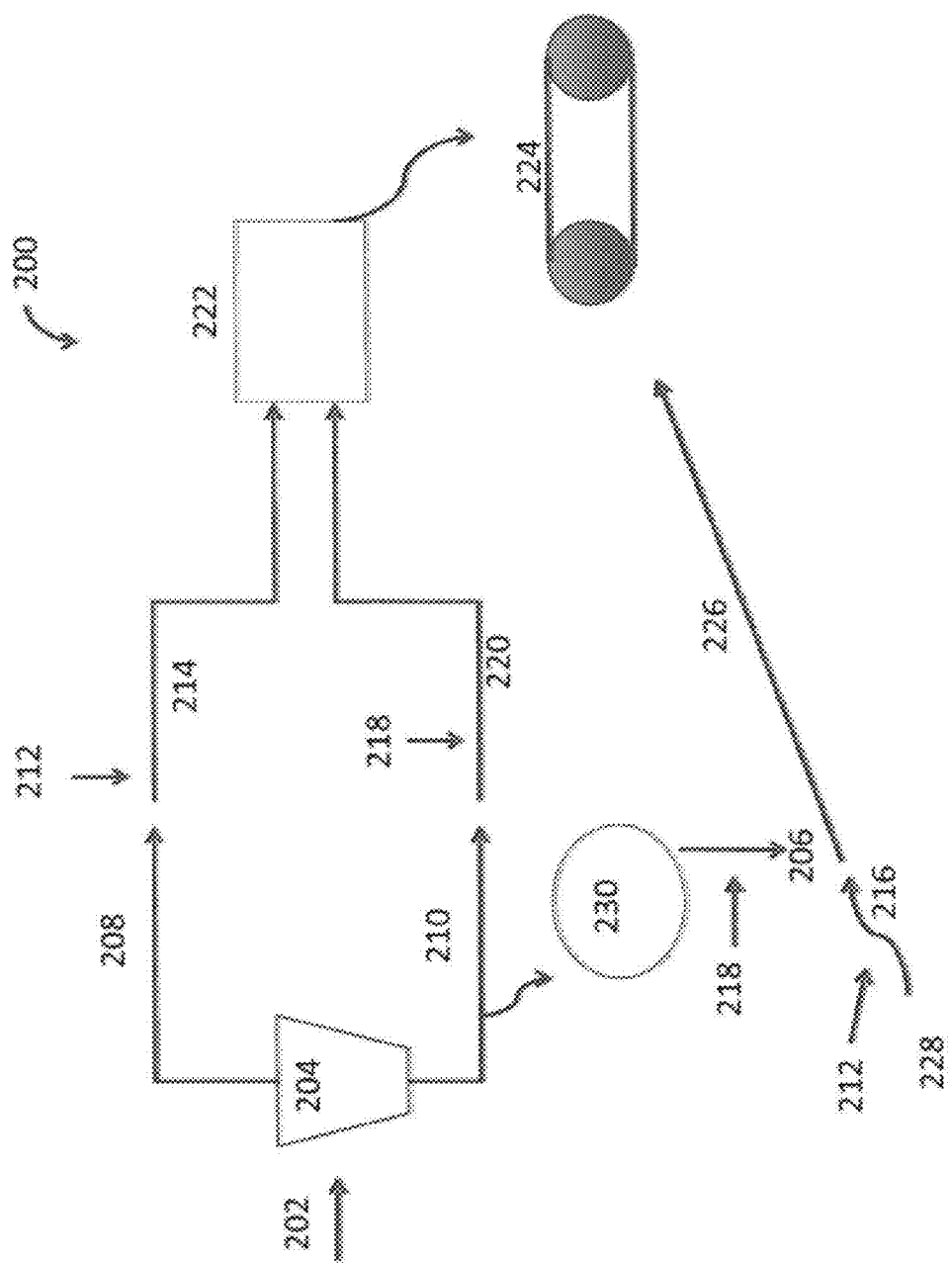
FIG. 2 shows a diagram of fluid separation processes.

Illustrative examples of in-line processing are depicted in FIGS. 1-3, and are described below.

b. Treatment Ponds

The systems and methods disclosed herein can be used for treatment of tailings at a facility remote from the oil sands production facility or in a pond. Similar principles are involved: the fluid stream bearing the fine tailings can be treated with an anionic activating agent, preferably initiating flocculation. A tether-bearing anchor particle system can then be introduced into the activated tailings stream, or the activated tailings stream can be introduced into a tether-bearing anchor particle system. In embodiments, a tailings stream containing fines can be treated with an activating agent, as described above, and applied to a stationary or moving bed of tether-bearing anchor particles. For example, a stationary bed of tether-bearing anchor particles can be arranged as a flat bed over which the activated tailings stream is poured. The tether-bearing anchor particles can be within a container or housing, so that they can act as a filter to trap the activated tailings passing through it. On a larger scale, the tether-bearing anchor particles can be disposed on a large surface, such as a flat or inclined surface (e.g., a beach), so that the activated tailings can flow over and through it, e.g. directionally toward a pond.

As an example, sand particles retrieved from the underflow fluid stream can be used as the anchor particles to which a cationic tether is attached. A mass of these tether-bearing anchor particles can be arranged to create a surface of a desired thickness, forming an "artificial beach" to which or across which the activated tailings can be applied. As would be appreciated by those of ordinary skill in the art, the application of the activated tailings to the tether-bearing anchor particles can be performed by spraying, pouring, pumping, layering, flowing, or otherwise bringing the fluid bearing the activated tailings into contact with the tether-bearing anchor particles. The activated tailings are then associated with the tether-bearing anchor particles while the remainder of the fluid flows across the surface and into a collection pond or container.

c. Tailings Pond Remediation

In embodiments, an adaptation of the activator-tether-anchor systems disclosed herein can be applied to the remediation of existing tailings ponds. Tailings ponds comprise four layers of materials, reflecting the gravity-induced settlement of fresh tailings after long residence periods in the pond. The top layer in the tailings pond comprises clarified water. The next layer is a fluid suspension of fine clay particles like fine tailings. The third layer, called "mature fine tailings (MFTs)," is a stable suspension of fluid fine tailings that has undergone self-weight consolidation/dewatering to a density of about 30 to 45 wt % solids content over a period of about 2 or 3 years after deposition and that lacks sufficient strength to form a trafficable surface. The rate of consolidation for MFTs is substantially reduced after the initial self-weight consolidation period, and the suspension acts like a viscous fluid containing suspended fine clay particles that have not yet settled out. The bottom layer is formed predominately from sand that has settled by gravity.

Desirably, the mature fine tailings (MFTs) can be treated to separate the water that they contain from the fine clay particles suspended therein. If the MFTs can be treated, the resultant clarified water can be drawn off and the solid material can be reclaimed. This could reduce the overall size of the tailings ponds, or prevent them from growing larger as fresh untreated tailings are added.

In embodiments, the systems and methods disclosed herein can be adapted to treat MFTs, such as are contained in tailings ponds. These systems and methods thus present an opportunity for treating the tailings ponds overall. In an embodiment, an activating agent, for example, one of the anionic polymers disclosed herein can be added to a pond, or MFT layer within a tailings pond, such as by injection with optional stirring or agitation. Tether-bearing anchor particles can then be added to the pond or layer containing the activated MFTs. For example, the tether-bearing anchor particles can be added to the pond from above, so that they descend through the activated MFT layer. As the activated MFT layer is exposed to the tether-bearing anchor particles, the flocculated fines can adhere to the anchor particles and be pulled down to the bottom of the pond by gravity, leaving behind clarified water. The tailings pond can thus be separated into two components, a top layer of clarified water, and a bottom layer of congealed solid material. The top layer of clarified water can then be recycled for use, for example in further oil sands processing. The bottom layer of solids can be retrieved, dewatered and used for construction purposes, landfill, and the like. In another embodiment, a dredge can be used to pump the MFT layer from the pond and bring it into contact with activator and tethered anchor particles, before depositing the treated material into the same pond or another disposal or reclamation area.

d. Treating Waste or Process Streams with Amine Modified Particles

Particles modified in accordance with these systems and methods may be added to fluid streams to complex with the particulate matter suspended therein so that the complex can be removed from the fluid. In embodiments, the modified particles and the particulate matter may interact through electrostatic, hydrophobic, covalent or any other type of interaction whereby the modified particles and the particulate matter form complexes that are able to be separated from the fluid stream. The modified particles can be introduced to the process or waste stream using a variety of techniques so that they complex with the particulate matter to form a removable complex. A variety of techniques are also available for removing the complexes from the fluid stream. For example, the modified particles can be mixed into the stream and then separated via a settling process such as gravity or centrifugation. If buoyant or low-density modified particles are used, they can be mixed with the stream and then separated by skimming them off the surface. In another method, the process stream could flow through a bed or filter cake of the modified particles. In any of these methods, the modified particles interact with the fine particulates and pull them out of suspension so that later separation removes both modified particles and fine particulates.

As would be appreciated by artisans of ordinary skill, a variety of separation processes could be used to remove the complexes of modified particles and fine particulates. For example, if the modified particles were modified so as to be magnetic, the complexes of modified particles and fine particulates could be separated using a magnetic field. As another example, of the modified particles were modified so as to be electrically conductive, the complexes of modified particles and fine particulates could be separated using an electric field.

B. Processes and Apparatus

Disclosed herein are processes and apparatus for removing dispersed fine materials from fluid streams. The processes and apparatus disclosed herein are useful for removing fine materials suspended in the effluent from oil sands processing. As would be understood by those of ordinary skill in the art, whole tails produced by oil sands extraction can be fed into a hydrocyclone unit that separates the whole tails into two streams, a so-called "overflow" fluid stream containing suspended clay fines and a so-called "underflow" fluid stream containing separated sand. In an embodiment in accordance with this disclosure, the "overflow" stream can be treated with a chemical system that allows for the separation of the suspended fines from the water in which they are suspended, yielding a clarified water product and a solid, mechanically stable product.

As an illustrative embodiment, FIG. 1 depicts a process for whole tails separation in accordance with this disclosure. As shown in FIG. 1, a whole tails stream 102 enters a hydrocyclone or equivalent separator 104 and is separated into two fluid streams, an overflow fluid stream 108 and an underflow fluid stream 110. The overflow fluid stream 108 contains the suspended clay fines resulting from the oil sands extraction process. The underflow fluid stream 110 contains sand, also resulting from the oil sands extraction process. The overflow fluid stream 108 can be treated with a chemical additive system 112 that permits the separation of the overflow fluid stream 108 into recyclable water 114 and a mechanically stable solid 118.

The chemical additive system 112 includes three components: 1) an Activator polymer added in small doses to the overflow fluid stream 108, 2) a Tethering polymer that has a high affinity for the Activator polymer, and 3) an Anchor particle upon which the Tethering polymer is coated. In embodiments, the Activator polymer is first added to the overflow fluid stream 108, and then Anchor particles coated with the Tethering polymer are added to the overflow fluid stream. In other embodiments, the two polymers may be added simultaneously. The Activator polymer added to the overflow fluid stream 108 causes the dispersed clay fines in the stream 108 to aggregate loosely. The Anchor particles bearing the Tether polymer are then added. When the Activated tailings are combined with the armed Anchor particles, the aggregates in the tailings bind quickly with the tethers on the Anchor particles to form large, robust, solid clusters.

Increased compatibility of the activated fine materials with a denser (anchor) matrix modified with the appropriate tether polymer can lead to further mechanical stability of the resulting composite material. This becomes quite important when dealing with tailings resulting from mining. This composite material can then be further utilized within the project for road building, dyke construction, or even land reclamation, rather than simply left in a pond to settle at a much slower rate.

The Activator-Tether-Anchor ("ATA") chemical additive system described above can be used in processes for separating whole tails into recyclable water and mechanically stable solids.

As another illustrative embodiment, FIG. 2 presents a diagram showing how the ATA system may be used for separating recyclable water and mechanically stable solids from fluid streams such as whole tails or mature fine tails.

As shown in FIG. 2, a fluid stream of whole tails 202 from oil sands processing can be separated by a hydrocyclone 204 or similar separation apparatus into two fluid streams, an overflow stream 208 containing suspended fine clay particles and an underflow fluid stream 210 containing sand. In the depicted process, the overflow fluid stream 208 can be treated with an activator polymer 212 as disclosed above, which can interact with the suspended clay fines to form loose agglomerates. The activator particle 212 can be introduced into the overflow fluid stream 208 via an introducer (not shown) familiar to those of ordinary skill in the art. For example, the activator particle 212 could be introduced into the overflow fluid stream by an injector, or by a separate fluid path. The loose agglomerates are carried in suspension in a first treated stream 214. As further shown in FIG. 2, the underflow fluid stream 210 can be treated with a tethering polymer 218, which binds to the sand in the underflow fluid stream 210. The tethering polymer 218 can be introduced into the underflow fluid stream 210 via an introducer (not shown) familiar to those of ordinary skill in the art. For example, the tethering particle 218 could be introduced into the underflow fluid stream by an injector, or by a separate fluid path. The tethering polymer coating the sand is carried along as part of a second treated stream 220. The first treated stream 214 and the second treated stream 220 are combined and mixed together inline or in an optional mixing apparatus 222, such as a headbox, agitator, or other mixing device. While in the mixing apparatus 222, the two fluid streams allow the loose agglomerates and the tether-bearing anchor particles to interact. The interaction of the loose agglomerates and the tether-bearing anchor particles produces a durable solid material wherein the clay fines are trapped in complexation with the sand by means of the activator-tether reaction. This durable solid material can be separated from the fluid supporting it to yield clear, recyclable water.

FIG. 2 further depicts a separation system 224 that can be used in conjunction with the tailings treatment apparatus described above. A separation system can include a porous conveyor belt apparatus, analogous to those systems used in the papermaking industry. In an exemplary porous conveyor belt apparatus, the mixture of fluids and agglomerated solids resulting from the interactions described above can enter the system via a headbox. A moving belt containing a mechanical separator can move through the headbox, or the contents of the headbox are dispensed onto a moving belt, so that the wet agglomerates are dispersed along the moving belt. Separation can be accomplished by a variety of means, including drainage through the porous belt, the application of heat, the application of negative pressure, and the like. In other embodiments, other separation equipment can be used. As an example, a shale shaker, as may be found on oil drilling rigs, can be suitable for adaptation to separation in accordance with the disclosed process. In embodiments, the separation system can operate via filtration, with pressure differentials being regulated to optimize separation.

Other techniques for removing the activated-tethered-anchored complexes from the fluid stream are also available. For example, the tether-bearing anchor particles can be mixed into a stream carrying activated fine particles, and the complexes can then separated via a settling process such as gravity or centrifugation. In another method, the process stream carrying the activated fine particles could flow through a bed or filter cake of the tether-bearing anchor particles. In any of these methods, the modified particles interact with the fine particulates and pull them out of suspension so that later separation removes both modified particles and fine particulates.

As would be appreciated by artisans of ordinary skill, a variety of separation processes could be used to remove the complexes of modified particles and fine particulates. For example, thickener vessels, including paste thickener, could be used. Various mechanical separators could be used, such as centrifugation, a belt press, a plate and frame filter, beaching, and the like. In other embodiments, the physical properties of the various particles could be manipulated to facilitate separation. For example, if the anchor particles had magnetic properties, the complexes formed by the interaction of tether-bearing anchor particles and activated fine particulates could be separated using a magnetic field. As another example, if the tether-bearing anchor particles were prepared so that they were electrically conductive, the complexes formed by the interaction of tether-bearing anchor particles and activated fine particulates could be separated using an electric field.

As would be further appreciated by those of ordinary skill, tether-bearing anchor particles could be designed to complex with a specific type of activated particulate matter. The systems and methods disclosed herein could be used for complexing with organic waste particles, for example. Other activation-tethering-anchoring systems may be envisioned for removal of suspended particulate matter in fluid streams, including gaseous streams.

In embodiments, the separation system can operate by gravity drainage, allowing the water to separate from the fluid in the mixing apparatus 222 as the solids settle spontaneously. In embodiments, the fluid from the mixing apparatus 222 can be separated into recyclable water and stable solids by filtration. In embodiments, the fluid from the mixing apparatus 222 can be transported to a remote location, where the water drains off spontaneously and leaves the solids as residua. As would be understood in the art, any combination of separation techniques can be adapted for use with the tailings treatment processes disclosed herein.

Also shown in FIG. 2 is a treatment process for mature fine tails 228, suitable for integration with the treatment of whole tails, or suitable for free-standing operation. Currently, whole tails produced during oil sands processing are separated into two fluid streams, an overflow stream and an underflow stream. The coarse sand in the underflow stream can be separated out and used for construction or mine reclamation. The overflow stream, however, contains the suspended clay fines and possesses liquid-like rheological properties. It is typically pumped to containment facilities such as tailings ponds to allow gravity settling over time. As the overflow stream of fluid tailings settles, it ultimately separates into layers over time. One of the layers is known as mature fine tails (MFTs), a durable suspension of fines, bitumen and water. Existing tailings ponds, covering over 50 km2 of area, are considered to be sources of significant environmental damage. The ability to treat MFTs can allow the oil sands producers to decrease the size of existing tailings ponds.

As depicted in FIG. 2, a stream of MFTs 228 can be directed into the treatment facility 200. The MFT stream 228 can then be treated with an activator polymer 212 to form a treated MFT stream 216 which contains the loose aggregates of fines and activator polymer 212 as described above. A supply of sand 230, either derived from the underflow stream 210 or obtained by other means, can be treated with a tether polymer 218 to form an anchor-tether complex 206. The anchor-tether complex 206 can be added to the treated MFT stream 216 and the two components can be mixed along a mixing conduit 226. The mixing conduit 226 may include one or more vessels (not shown) where mixing takes place. Mixing the treated MFT stream 216 with the anchor-tether complex 206 allows the anchor-bound tethers to attach tightly to the loose aggregates, forming a durable solid material wherein the clay fines are trapped in complexation with the sand by means of the activator-tether reaction. The durable solid material can then be separated out, with residual clear recyclable water. The durable solid material can be dewatered using dewatering systems such as those disclosed herein.

Figure 3A:
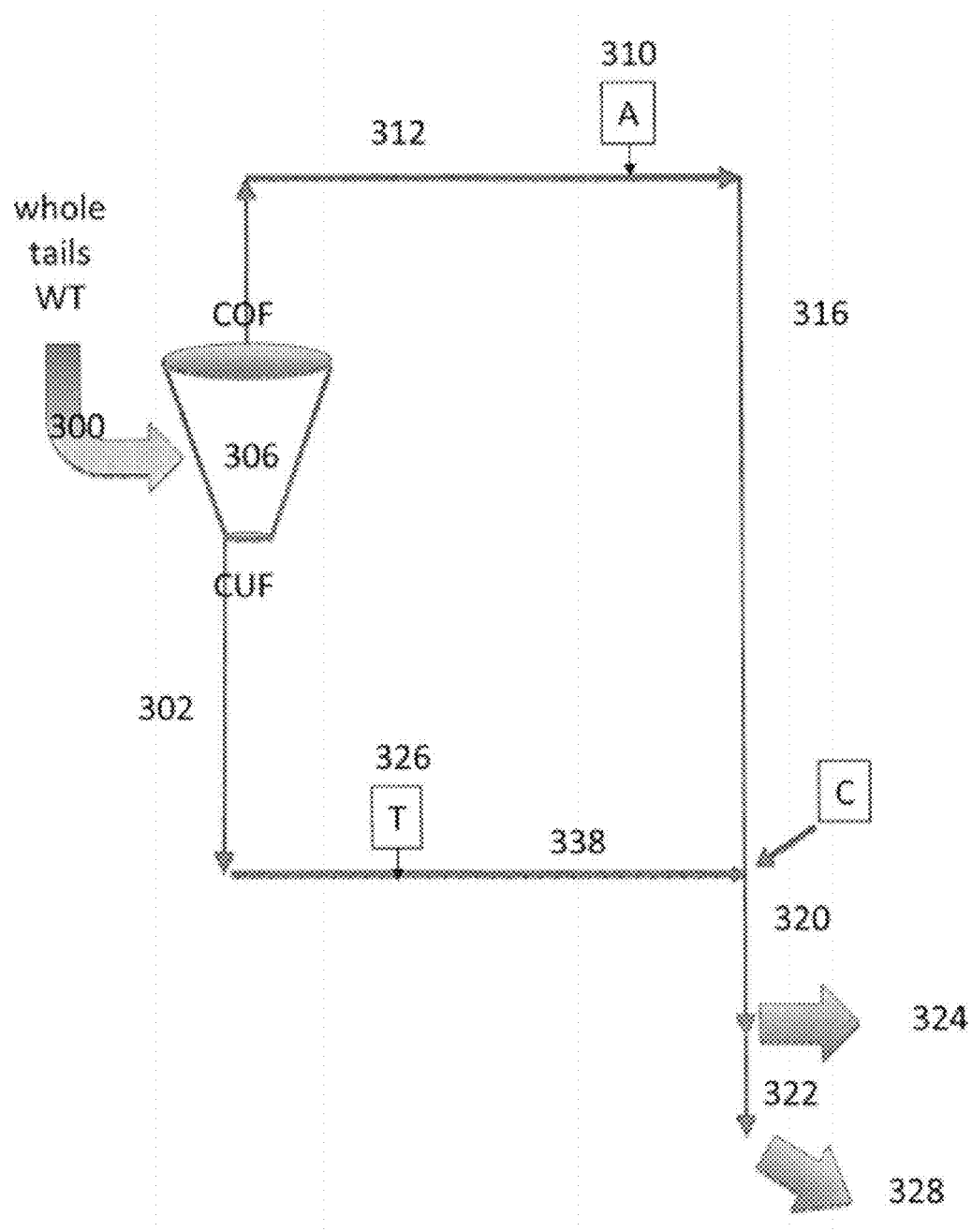
FIGS. 3A-B show diagrams of fluid separation processes.

As another illustrative embodiment, FIG. 3A depicts a system for removing fine particulate matter from a fluid, here a system for whole tails (WT) separation in accordance with this disclosure. As shown in FIG. 3, an inflow stream comprising a whole tails stream 300 enters a hydrocyclone or equivalent separator 306 and is separated into two fluid streams, an overflow fluid stream COF and an underflow fluid stream CUF. The inflow stream comprises fine particulate matter and course particulate matter suspended therein. As depicted, the inflow stream comprises whole tails, wherein clay fines are suspended as fine particulate matter, and sand is suspended as coarse particulate matter. Following the separation of the inflow fluid stream, the overflow fluid stream COF contains the suspended clay fines resulting from the oil sands extraction process, and he underflow fluid stream CUF contains sand, also resulting from the oil sands extraction process.

As shown in this Figure, the flow path 312, termed an overflow path, carries the suspended fine particulate matter that will be treated by contacting it with an activating material capable of being affixed to the fine particulate matter to form activated particles. The activating material is injected into the overflow path 312 at point A via an activator injector 310, understood to be a device or system configured to introduce a preselected dose of activating material into the overflow path to complex with the fine particulate matter to form activated particles. Following introduction of the activating material, the suspension in the overflow path forms a first treated fluid stream 316.

As shown in this Figure, the flow path 302, termed the underflow path, carries the suspended coarse particulate matter that will be treated by contacting it with a tethering material capable of being affixed to the coarse particulate matter to form anchor particles. The tethering material is injected into the underflow path 302 at point T via a tether injector 326, understood to be a device or system configured to introduce a preselected dose of tethering material into the underflow path to complex with the coarse particulate matter to form anchor particles. Following introduction of the tethering material, the suspension in the underflow path forms a second treated fluid stream 338. It is understood that additional treatments of the underflow path, such as pH adjustment, can also be performed.

As depicted in FIG. 3A, the first treated fluid stream 316 and the second treated fluid stream 338 can be admixed at a commingler C to form a conjoined fluid stream 320 wherein the activated particles from the first treated stream 316 complex with the anchor particles from the second treated fluid stream 338 to form removable complexes in accordance with the principles disclosed herein. The conjoined fluid stream 320 can then be directed to one or more settling facilities 324 and/or 328, where the removable complexes are separated from the fluid in which they are suspended. As the removable complexes contain the fine particulate matter originally suspended in the fluid, separating the removable complexes out of the conjoined fluid stream 320 removes the fine particulate matter from the fluid. In certain embodiments, the entire conjoined fluid stream 320 can be directed to a single settling facility 324. In other embodiments, some of the conjoined fluid stream 320 can be directed to a first settling facility 324, while the remainder of the conjoined fluid stream follows a disposal path 322 and is directed to a second facility 328 for impoundment, or where removable complexes can be separated out, or where further treatment can be undertaken. For the purposes of this disclosure, the term settling facility can include any system, device, apparatus, process, or static facility where removable complexes are separated from the fluid in which they reside.

Figure 3B:
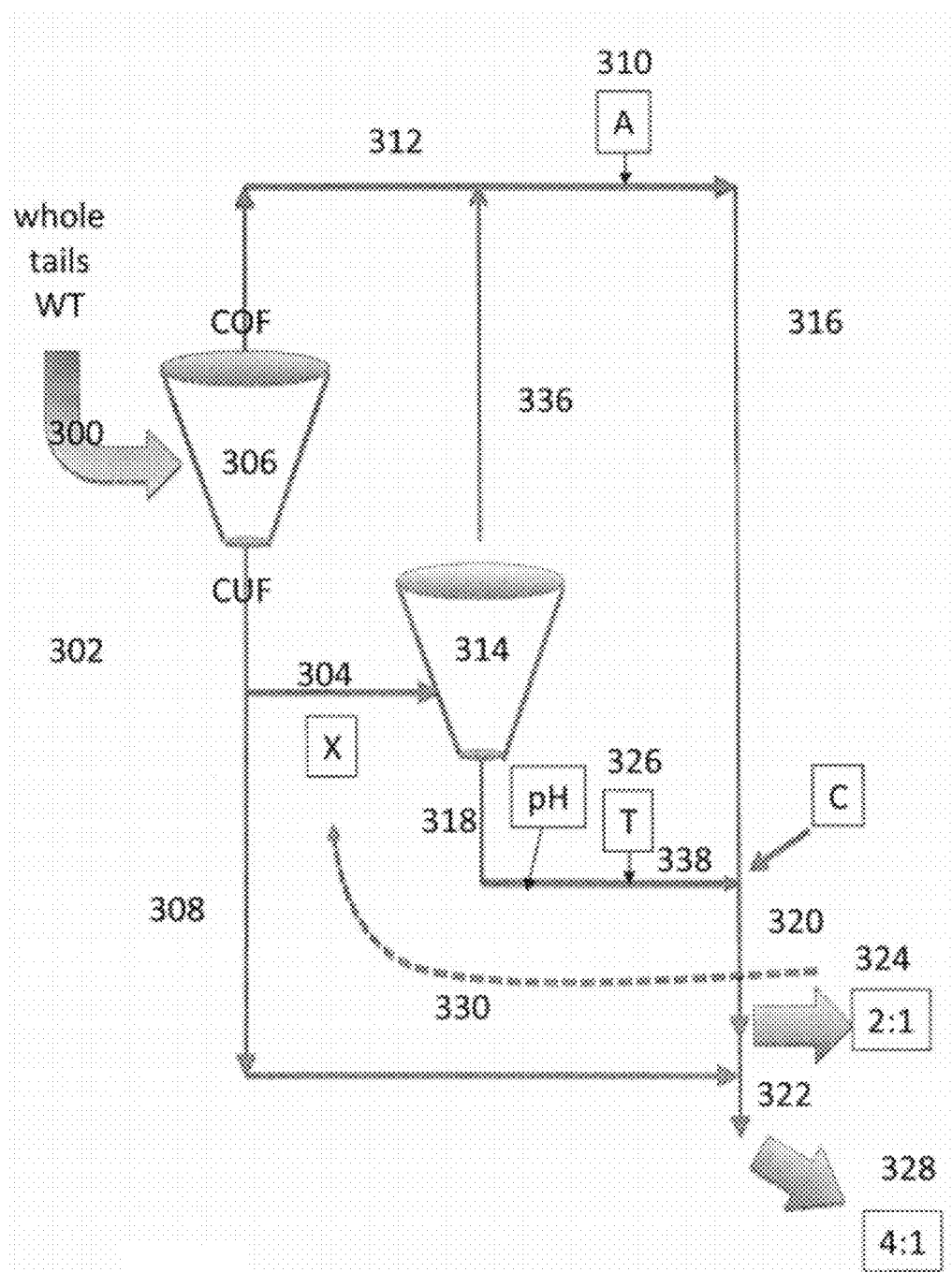

As another illustrative embodiment, FIG. 3B depicts a system for removing fine particulate matter from a fluid, here a system for whole tails (WT) separation in accordance with this disclosure. As shown in FIG. 3B, an inflow stream comprising a whole tails stream 300 enters a hydrocyclone or equivalent separator 306 and is separated into two fluid streams, an overflow fluid stream COF and an underflow fluid stream CUF.

In certain cases, depending upon the composition of the WT, the CUF contains a certain fraction of residual fines. For example between 2-20% of the CUF solids by weight can be comprised of residual fines. As an example, the CUF may be characterized by a 9:1 sand-to-fines ratio (SFR).

In the depicted embodiment, the underflow path 302 for the CUF is split into two underflow subpaths 304 and 308, with a portion of the CUF being directed to each flow path. For example, 50% of the CUF can be directed to each flow path, although other ratios of CUF flow can be designated for each flow path, based on operational parameters for the specific separation process. The portion of underflow path 302 that is directed to flow path 304 is dependent upon the amount of tethered CUF solids needed to treat the activated COF or MFT stream. For the purposes of this disclosure, each underflow subpath and its divisions into further underflow subpaths is to be considered an underflow path. For example, flow paths 304 and 318 in FIG. 3B are both underflow paths.

In a preferred embodiment, a portion of the CUF flow path 302 is diverted to a first underflow subpath 308 to follow a disposal path 322 for disposal or impoundment at a facility 328 without further chemical treatment. This action minimizes the amount of solids that require chemical treatment, making the process more economically viable. The amount of flow diverted to the first underflow subpath 308 might be determined by a minimally acceptable level of tethered CUF solids required to create a suitable activator-tether-anchor (ATA) deposit.

In the depicted embodiment, CUF in a second underflow subpath 304 is directed to a second hydrocyclone or equivalent separator 314 that further clarifies the CUF stream, removing more of the fines from the CUF stream in underflow subpath 304. It is understood that the benefit of a second separator is to minimize the amount of tethering material required to treat the CUF solids, since the residual fines fraction of the CUF can have a high demand for tethering material. While the depicted embodiment contains two cyclones, it is understood that more than two cyclones could be used in a preselected sequence, for example, in series or in parallel. In embodiments, the overflow from the second separator could be directed along flow path 336 to combine with flow path 312 to allow the fine solids from the second separator's overflow to be activated. In embodiments, the clarified CUF exiting the second hydrocyclone 314 can have a SFR of about 19:1. Treatment of the CUF at the higher SFR can allow a lower and more cost-effective tether dose.

In embodiments, the CUF on the underflow path 302 can be treated by adjusting its pH, either before or after the underflow path 302 splits into subpaths. In the depicted embodiment, the CUF from the second separator 314 can be treated by adjusting the pH as indicated at Point pH in the illustration, for example along fluid path 318. In embodiments, the pH adjustment is added at a point after separation of the flow path 302 into its subpaths 304 and 308, for example along path 304 or along 318, minimizing the amounts of pH adjusting chemicals needed. pH adjustment can alter the amount of treatment polymers utilized in treating the CUF streams in accordance with the depicted process. For example, a decrease in CUF pH from 8.5 to 6.5 can decrease the amount of tethering polymer that the system uses. In a preferred embodiment, the pH adjustment is conducted at Point pH after a second (or final) separator step and before addition of the tethering material at Point T, for example along fluid path 318. In an embodiment, the pH adjustment substance and the tethering material can be added as a mixture, so that Point pH and Point T are substantially coincident. In an embodiment, Point pH and Point T are separated along the fluid path, with a preselected distance between them.

Following treatment in the second separator 314, the clarified CUF follows fluid path 318, where it is treated with a tethering polymer 326 added at Point T, for example by means of an injector device. As used herein, the term "injector device" refers to any device or system that adds a chemical component into a fluid path. As has been previously described, the tethering polymer 326 is a component of a chemical additive system to remove suspended fines. As has been previously described, this chemical additive system includes three components: 1) an Activator polymer added in small doses to a fluid stream bearing fines, 2) a Tethering polymer that has a high affinity for the Activator polymer, and 3) an Anchor particle upon which the Tethering polymer is coated. In the depicted process, the sand in the CUF acts as Anchor particles to which the Tethering polymers added through a tether injector 326 attach at Point T to form a treated fluid stream 338 bearing anchor particles.

Following attachment of the Tethering polymer 326 to sand in the CUF, the treated CUF in the treated fluid stream 338 is directed to admix with a treated overflow fluid stream 316 bearing activated fine particles, as will be described below. The activated fine particles in the treated fluid stream 316 are produced as follows. After initial separation of the whole tails inflow fluid stream 300 in the separator 306, a COF stream is produced containing the majority of the suspended clay fines from the whole tails. In the depicted embodiment, the COF follows overflow path 312 in the Figure, along which it can be dosed with an activator polymer added through an activator injector 310 at Point A. Following the addition of the activator polymer via the activator injector 310, the treated COF follows flow path 316 to be mixed with the treated CUF material.

The treated COF following flow path 316 joins with the treated CUF following flow path 318 at a junction point or commingler C to form the conjoined treatment stream 320, where the Anchor particles coated with the Tethering polymer in the treated CUF interact with the Activated fines in the treated COF to form removable complexes. The interaction of these components of the Anchor-Tether-Activator system result in the formation of large, robust, solid clusters (i.e., the removable complexes), as previously described. The fluid stream bearing these clusters (not shown) can be directed along fluid path 320 to a settling facility or other designated area 324 where the clusters can be separated from recyclable water. The recyclable water retrieved from the settling process at 324 can be re-introduced into the system at Point X via fluid path 330, or can be used at other points within the system. In embodiments, a part of the conjoined fluid stream 320 can be directed along a disposal path 322 to a second facility 328 for impoundment, or where removable complexes can be separated out, or where further treatment can be undertaken.

In embodiments, the ATA solids deposited in area 324 might have a sand to fines ratio (SFR) of 2:1, compared to the whole tails stream 300 that might contain a SFR of about 4:1. This lower SFR enables treatment with a lower total amount of tethering material. In other embodiments, the untreated stream 308 might be combined with the ATA solids in stream 320 to create stream 322. This could enable co-disposal of untreated CUF 308 without harming the performance of the ATA solids in disposal area 328. The fully combined ratio of sand to fines (SFR) in area 328 would be about 4:1. The 4:1 SFR solids in disposal area 328 should have good drainage properties due to the sandy nature (i.e., 80% sand) of the deposit. The SFR values are listed as an example and it is understood that these values are variable.

EXAMPLES

Materials:
The following chemicals were used in the Examples below:
Washed Sea Sand, 50+70 Mesh
Sigma Aldrich
St. Louis, Mo.
Chitosan CG 800
Primex
Siglufjodur, Iceland
Branched Polyethyleneimine (BPEI) (50% w/v)
Sigma Aldrich
St. Louis, Mo.
Polyvinyl Amine—Lupamin 1595, Lupamin 9095
BASF
Ludwigshafen, Germany
Poly(diallyldimethylammonium chloride) (20% w/v)
Sigma Aldrich
St. Louis, Mo.
Poly(epichlorohydrin/dimethylamine) (50% w/w)
Polymer Ventures, Inc.
Charleston, S.C.
FD&C Blue #1
Sigma Aldrich St. Louis, Mo.
Hydrochloric Acid
Sigma Aldrich
St. Louis, Mo.
Tailings Solution from a low-grade tar sand
Dicalite, Diatomaceous Earth
Grefco Minerals, Inc.
Burney, Calif.
3-Iso cyanatopropyltriethoxysilane
Gelest
Morrisville, Pa.
Sodium Hydroxide
Sigma Aldrich
St. Louis, Mo.
Isopropyl Alcohol (IPA)
Sigma Aldrich
St. Louis, Mo.
Magnafloc LT30
Ciba
Basel, Switzerland Example 1

BPEI Coated Diatomaceous Earth

Diatomaceous earth (DE) particles coupled with BPEI are created using a silane coupling agent. 100 g of DE along with 1000 mL isopropyl alcohol (IPA) and a magnetic stir bar is placed into an Erlenmeyer flask. 1 gm 3-Isocyanatopropyltriethoxysilane is added to this solution and allowed to react for 2 hours. After 2 hours, 2 mL of BPEI is added and stirred for an additional 5 hours before filtering and washing the particles with IPA 2×'s and deionized water (DI water). The particles are then filtered and washed with a 0.12 M HCl solution in isopropanol (IPA) then dried.

Example 2

1% Chitosan CG800 Stock Solution

The chitosan stock solution is created by dispersing 10 g of chitosan (flakes) in 1000 mL of deionized water. To this solution is added hydrochloric acid until a final pH of 5 is achieved by slowly and incrementally adding 12 M HCl while continuously monitoring the pH. This solution becomes a stock solution for chitosan deposition.

Example 3

Diatomaceous Earth—1% Chitosan Coating 10 g of diatomaceous earth is added to 100 mL deionized water with a stir bar to create a 10% slurry. To this slurry is added 10 mL's of the 1% chitosan stock solution of CG800. The slurry is allowed to stir for 1 hour. Once the slurry becomes homogeneous the polymer is precipitated out of solution by the slow addition of 0.1N sodium hydroxide until the pH stabilizes above 7 and the chitosan precipitates onto the particles of diatomaceous earth. The slurry is filtered and washed with a 0.05 M HCl solution in isopropanol (IPA) then dried.

Example 4

Particle Performance on Tailings Solution

Coated and uncoated diatomaceous earth particles were used in experiments to test their ability to settle dispersed clay fines in an aqueous solution. The following procedure was used for each type of particle, and a control experiment was also performed where the particle addition step was omitted.

One gram of particles was added to a centrifugation tube. Using a syringe, the centrifugation tube was then filled with 45 ml of tailing solution containing dispersed clay. One more tube was filled with just the tailings solution and no diatomaceous earth particles. The tube was manually shaken for 30 seconds and than placed on a flat countertop. The tube was then observed for ten minutes allowing the clay fines to settle out.

Results

No DE addition (control samples): Tailing solution showed no significant improvement in cloudiness.

DE Coated with Chitosan: Tailing solution was significantly less cloudy compared to control samples.

DE Coated with BPEI: Tailing solution was significantly less cloudy compared to control samples.

DE Uncoated: Tailing solution showed no significant improvement in cloudiness compared to control samples.

Example 5

Preparation of Polycation-Coated Washed Sea Sand

Washed sea sand is coated with each of the following polycations: chitosan, lupamin, BPEI, and PDAC. To perform the coating, an aqueous solution was made of the candidate polycation at 0.01M concentration, based on its molecular weight. 50 g washed sea sand was then placed in a 250 ml jar, to which was added 100 ml of the candidate polycation solution. The jar was then sealed and rolled for three hours. After this, the sand was isolated from the solution via vacuum filtration, and the sand was washed to remove excess polymer. The coated sea sand was then measured for cation content by solution depletion of an anionic dye (FD&C Blue #1) which confirmed deposition and cationic nature of the polymeric coating. The sea sand coated with the candidate polymer was then used as a tether-attached anchor particle in interaction with fine particulate matter that was activated by treating it with an activating agent.

Example 6

Use of Polymer-Coated Sea Sand to Remove Fine Particles From Solution

In this Example, a 45 ml. dispersion of fine materials (7% solids) from an oil sands tailings stream is treated with an activating polymer (Magnafloc LT30, 70 ppm). The fines were mixed thoroughly with the activating polymer. 10 gm of sea sand that had been coated with PDAC according to the methods of Example 1 were added to the solution containing the activated fines. This mixture is agitated and is immediately poured through a stainless steel filter, size 70 mesh. After a brief period of dewatering, a mechanically stable solid is retrieved. The filtrate is also analyzed for total solids, and is found to have a total solids content of less than 1%.

Example 7

Control Example

Use of Sea Sand without Polymer Coating to Remove Fine Particles from Solution

In this Example, a 45 ml. dispersion of fine materials (7% solids) is treated with an activating polymer (Magnafloc LT30, 70 ppm). The fines were mixed thoroughly with the activating polymer. 10 gm of uncoated sea sand were added to the solution containing the activated fines. This mixture is agitated and is immediately poured through a stainless steel filter, size 70 mesh. The filtrate is analyzed for total solids, and is found to have a total solids content of 2.6%.

Example 8

Tailings Treatment

A typical Incoming stream of whole tailings can include the following components: sand (>44 micron) 53% (by mass), fines 6% (<44 micron); water 41% and bitumen 0.5%. The whole tail stream can be split using a hydrocyclone or equivalent separator into cyclone overflow (COF)—fine tails (typically 10% fines, 2% sand), and cyclone underflow (CUF)—course tails typically 74% sand, 24% water, 2% fines. The COF can be subsequently treated by the addition of activator polymer in the range of 5 ppm-250 ppm (g/cubic meter of solution) with 80 ppm being the preferred dose. The CUF stream (or a portion of such stream) can subsequently be mixed with tethering polymer at a dose ranging from 5 ppm-2000 ppm (g/tonne of solid) with 1000 ppm being the preferred dose. Dosing of the CUF and COF streams is typically represented as a sands to fine ratio (SFR) which is defined as the ratio of mass of underflow ("sand") and the mass of the solids fines in the CUF stream. Typical whole tail streams have SFR of around 4:1, this represents the maximum ratio of CUF that can be mixed with COF. Both the activator and tether can be mixed with their respective streams via in line injection of polymer or with dedicated mixing tanks Upon sufficient mixing of the polymers and their streams, the two streams can be recombined. Typical recombination SFR is between 0.5:1 up to 4:1 (recombination of the entire stream of CUF with COF). Desirably, the SFR is 1.1:1 for the ATA process. At this ratio, there can be excess CUF available for use. After mixing of ATA treated CUF and COF the mixture can be dewatered.

Example 9

Dewatering

Dewatering can be done rapidly by filtration by depositing the solids onto a conveyer belt covered with mesh of large enough porosity to allow filtration but small enough to retain the solid component—typically the screen is 80 mesh. Additionally, vacuum may be used to assist the filtration and speed the dewatering. Dewatering by gravity alone within 1-5 minutes can recover 70-75% of the water in the system. At the end of the conveyor belt, a scraping blade can be used to remove the solids from the filter mesh and collect the solids for transport to the reclamation area. Alternatively, the mixture of CUF and COF, prior to dewatering, may be transported hydraulically to the site of reclamation and dewatered at that point—either by filtration, or by gravity dewatering at the site (stacking the solids and collecting the water runoff in a trough or dike for recycle).

Example 10

Mature Fine Tails (MFT) Input Stream

A stream of mature fine tailings (MFT) can be used as a source of fines material. MFT is typically around 30% solids by weight of fines material; the MFT could be treated with activator polymer as is or diluted with water prior to activation to match the COF concentration at around 10%. The MFT stream would be activated with the appropriate dose of polymer and combined with the excess CUF from the whole tails stream. If not already completed, the CUF would need to be "tethered" with polymer before interaction with the MFT. The resulting solid would be materially the same as at the exit of the whole tails stream described in Example 8-60-65% solids in the final material, with 70-75% recoverable water. Dewatering may be accomplished via the same methods as described in Example 9.

Example 11

Separately Treated Whole Tails Streams

A whole tails stream was produces by combining coarse sand and fines streams to have a 4:1 SFR while at 35% solids. The whole tails was split into two separate streams, 240 g of whole tails was treated with 500 ppm PDAC, while 52 g of whole tails was activated with 800 ppm activator Magnafloc LT30. The two streams were combined together and added to a 250 mL graduated cylinder to settle. The resulting supernatant had a turbidity of 250 NTU while the pack bed settled down to 155 mL.

Example 12

Coated Sand with Activated Whole Tails

A portion of 70% solids CUF was tethered with 500 ppm PDAC while whole tails was activated with 800 ppm Magnafloc LT30. The two streams were combined in a 1:1 ratio by weight and mixed together to become homogenous. A 250 mL graduated cylinder was filled with the homogenous slurry and left to settle over the period of 30 minutes. The resulting supernatant had a turbidity of 755 NTU while the pack bed settled to about 150 mL.

Example 13

Tethered Underflow with Activated Overflow

A cyclone underflow sample with a composition of about 95% sand and 5% fines was prepared at 70% solids. The slurry was coated with PDAC at 500 ppm. A cyclone overflow sample with a composition of 100% fines was prepared at 10% solids. The overflow sample was activated with 800 ppm Magnafloc LT30. The tethered overflow and activated underflow streams were combined to give a final SFR of 4:1. The slurry was mixed until homogenous then transferred to a 250 mL graduated cylinder to settle. The resulting supernatant had a turbidity around 100 NTU with the pack bed settled down to about 130 mL.

Example 14

Tethered Underflow with Tethered Overflow

A cyclone underflow sample with a composition of about 95% sand and 5% fines was prepared at 70% solids. The slurry was coated with PDAC at 400 ppm. A cyclone overflow sample with a composition of 100% fines was prepared at 10% solids. The overflow sample was tethered with PDAC at 500 ppm then activated with 800 ppm Magnafloc LT30. The tethered overflow was combined with the activated and tethered underflow to give a final SFR of 4:1. The slurry was mixed until homogenous then transferred to a 200 mL jar. The slurry was sheared for a period of 30 seconds then allowed to settle for 30 minutes. The solids had remained intact and had not segregated. The supernatant prior to shear had a solids content of 0.30% and after shear 0.32%.

Example 15

Tethered Underflow with Activated Overflow Sheared

A cyclone underflow sample with a composition of about 95% sand and 5% fines was prepared at 70% solids. The slurry was coated with PDAC at 500 ppm. A cyclone overflow sample with a composition of 100% fines was prepared at 10% solids. The overflow sample was activated with 800 ppm Magnafloc LT30. The tethered overflow and activated underflow streams were combined to give a final SFR of 4:1. The slurry was mixed until homogenous then transferred to a 200 mL jar. The slurry was sheared for a period of 30 seconds then allowed to settle for 30 minutes. The solids separated into a top layer of fines and a bottom layer with flocs of fines and sands. The supernatant prior to shear had a solids content of 0.28% and after shear 0.82%.

EQUIVALENTS

While specific embodiments of the subject invention have been discussed, the above specification is illustrative and not restrictive. Many variations of the invention will become apparent to those skilled in the art upon review of this specification. Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth herein are approximations that can vary depending upon the desired properties sought to be obtained by the present invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of removing particulate matter from a fluid, comprising:
   providing an activator polymer capable of complexing with the particulate matter;
   treating a first fluid stream with the activator polymer to form a first treated fluid stream comprising activator polymer complexed with the particulate matter;
   providing a tether polymer that is capable of interacting with the activator polymer;
   adding the tether polymer to a second fluid stream containing anchor particles so that the tether polymer coats the anchor particles, thereby forming a second treated fluid stream comprising coated anchor particles; and
   mixing the first treated fluid stream and the second treated fluid stream to form removable complexes comprising the particulate matter and the anchor particles bound together by the interaction of the activator polymer and the tether polymer,
   wherein the activator polymer is an anionic or cationic polymer;
   wherein when the activator polymer is an anionic polymer, the tether polymer is a cationic polymer and when the activator polymer is a cationic polymer, the tether polymer is an anionic polymer; and
   wherein the method further comprises removing the removable complexes comprising the particulate matter from the fluid.

2. The method of claim 1, wherein the removable complex is removed by filtration.

3. The method of claim 1, wherein the removable complex is removed by centrifugation.

4. The method of claim 1, wherein the removable complex is removed by gravitational settling.

5. The method of claim 1, wherein fluid is whole tailing from oil sands processing.

6. The method of claim 5, wherein the coarse particulate matter is sand.

7. A method of removing particulate matter from a fluid stream, comprising:
   providing an activator polymer capable of complexing with the particulate matter;
   treating the fluid stream with the activator polymer to form a treated fluid stream comprising activator polymer complexed with the particulate matter;
   providing anchor particles coated with a tether polymer that is capable of interacting with the activator polymer;
   adding the coated anchor particles to the treated fluid stream, thereby forming removable complexes therein comprising the particulate matter and the anchor particles bound together by the interaction of the activator polymer and the tether polymer; and
   removing the removable complexes from the fluid stream;
   wherein the activator polymer is an anionic or cationic polymer and wherein when the activator polymer is an anionic polymer, the tether polymer is a cationic polymer and when the activating polymer is a cationic polymer, the tether polymer is an anionic polymer.

8. The method of claim 7, wherein the fluid stream comprises mature fine tails.

9. A method for removing fine particulate matter from a fluid, comprising:
   separating an inflow fluid stream comprising fine particulate matter and coarse particulate matter suspended therein into an overflow path comprising the suspended fine particulate matter and an underflow path comprising the suspended coarse particulate matter;
   introducing into the overflow path an activating material capable of being affixed to the fine particulate matter to form activated particles, said activated particles being suspended in a first treated fluid stream;
   introducing into the underflow path a tethering material capable of being affixed to the coarse particulate matter to form anchor particles, said anchor particles being suspended in a second treated fluid stream;
   wherein said activated particles and said anchor particles are capable of interaction to form removable complexes;
   combining the first treated fluid stream and the second treated fluid stream to form a conjoined treated fluid stream wherein activated particles complex with anchor particles to form removable complexes; and
   separating the removable complexes from the conjoined treated fluid stream,
   thereby removing fine particulate matter from the fluid;
   wherein the activating polymer is an anionic or cationic polymer and wherein when the activating polymer is an anionic polymer, the tethering mateial is a cationic polymer and when the activating polymer is a cationic polymer, the tethering mateial is an anionic polymer.

10. The method of claim 9, wherein fluid is whole tailing from oil sands processing.

11. The method of claim 10, wherein the anchor particles matter is sand.

* * * * *

UNITED STATES PATENT AND TRADEMARK OFFICE
CERTIFICATE OF CORRECTION

PATENT NO.         : 8,557,123 B2                                     Page 1 of 1
APPLICATION NO.    : 13/206164
DATED              : October 15, 2013
INVENTOR(S)        : Michael C. Berg et al.

It is certified that error appears in the above-identified patent and that said Letters Patent is hereby corrected as shown below:

In the Claims:

Column 30, Claim 6, Lines 17-18, please replace "coarse particulate matter is" with -- anchor particles are --;

Column 31, Claim 11, Line 5, please replace "anchor particles" with -- coarse particulate --.

Signed and Sealed this
Twenty-eighth Day of January, 2014

Michelle K. Lee
*Deputy Director of the United States Patent and Trademark Office*